(12) United States Patent
Tenmyo

(10) Patent No.: US 6,467,931 B2
(45) Date of Patent: *Oct. 22, 2002

(54) ILLUMINATION DEVICE HAVING OPTICAL MEMBER PROVIDING TOTAL REFLECTION OF PART OF AN INCIDENT LIGHT BEAM

(75) Inventor: Yoshiharu Tenmyo, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/454,452

(22) Filed: Dec. 6, 1999

(65) Prior Publication Data

US 2002/0071272 A1 Jun. 13, 2002

(30) Foreign Application Priority Data

Dec. 9, 1998 (JP) ............................................ 10-368542

(51) Int. Cl.⁷ .................................................. F21S 4/00
(52) U.S. Cl. .............................. 362/223; 362/16; 362/8; 362/327; 362/339
(58) Field of Search .............................. 362/16, 223, 8, 362/327, 328, 330, 339

(56) References Cited

U.S. PATENT DOCUMENTS

| | | | | |
|---|---|---|---|---|
| 5,539,622 A | * | 7/1996 | Ishikawa | 362/16 |
| 5,617,163 A | * | 4/1997 | Ohtake | 396/176 |
| 6,011,929 A | * | 1/2000 | Fuke et al. | 396/175 |
| 6,036,340 A | * | 3/2000 | Fohl et al. | 362/511 |

* cited by examiner

Primary Examiner—Sandra O'Shea
Assistant Examiner—Ronald E. DelGizzi
(74) Attorney, Agent, or Firm—Robin, Blecker & Daley

(57) ABSTRACT

An illumination device (flash device), which is suited to cameras, includes a flash discharge tube, and an optical member having an entrance surface which a light beam from the flash discharge tube is made to enter and an exit surface from which the light beam having entered the entrance surface is made to exit, wherein a plurality of prism portions are arranged at the exit surface of the optical member, and wherein a part of the plurality of prism portions totally reflect a part of the light beam having entered the entrance surface. The totally-reflected light beam returns to the entrance surface or a reflector and is again reflected therefrom to be efficiently radiated toward the subject.

20 Claims, 23 Drawing Sheets

(a) VERTICAL COMPONENT OF REFLECTED LIGHT
(b) 1/2 ( PARALLEL COMPONENT + VERTICAL COMPONENT OF REFLECTED LIGHT )
(c) PARALLEL COMPONENT OF REFLECTED LIGHT

INTENSITY OF REFLECTED LIGHT RELATIVE TO INCIDENT ANGLE

ILLUMINATION DEVICE HAVING OPTICAL MEMBER PROVIDING TOTAL REFLECTION OF PART OF AN INCIDENT LIGHT BEAM

BACKGROUND OF THE INVENTION

1. Field of the Invention

The present invention relates to illumination devices to be used for photography with video cameras or film cameras and, more particularly, to reduction of the size of such devices and increase of the efficiency with which to condense the illuminating light beam.

2. Description of Related Art

The illumination device for use with cameras or like photographic apparatuses is conventionally constructed with a light source (flash discharge tube), a reflector behind the light source and an optical member such as Fresnel lens.

In such an illumination device, as the light source radiates rays of light to all directions, a means must be provided for condensing the rays to a required angular field. So, many previous proposals have been made for increasing the efficiency at which to use flash light.

In particular, recently, the Fresnel lens that has so far been used in front of the light source is being replaced by what utilizes total reflection such as prism-light guide or like optical member. With this optical member, the beam can be condensed with a higher efficiency. In addition, the size of the illumination device can be reduced to a compact form.

In Japanese Laid-Open Patent Application No. Hei 4-138438, the optical member has a lens of positive refractive power for condensing that part of the light issuing from the light source which goes forward and a total-reflection surface from which another part of the light which radiates sideways is totally reflected to the front. With this arrangement, an illumination optical system proposed here is made to have a common exit surface.

In other words, the light from the light source enters the optical member at a surface thereof where its path splits in two. The two beams are brought to emerge from a common exit surface. For this purpose, use is made of prisms of reduced size with high efficiency of condensing the light beam.

Another Japanese Laid-Open Patent Application No. Hei 8-262537 proposes an illumination optical system as derived from that described above by limiting the values of the parameters and also by forming a vertical Fresnel lens in the exit surface of the optical member.

Yet another Japanese Laid-Open Patent Application No. Hei 8-234277 proposes an illumination optical system comprising light emitting means and optical means. To illuminate the subject, the light from the emitting means is conducted through the optical means of long length, by which it is bent to the subject. In such a manner, the efficiency of utilizing the light is improved.

In another Japanese Laid-Open Patent Application No. Hei 10-115852, the light beam from the light source is dispersed by an optical member to a certain range of angles of illumination. The optical member has an entrance surface confronting the light source, a reflection surface from which the entering light is partially reflected and/or part of it is totally reflected and an exit surface confronting the entrance surface and having a larger area than that of the entrance surface.

In recent years, the cameras or like photographic apparatuses are becoming smaller in size and lighter in weight themselves on one hand. Their taking lenses, on the other hand, tend to increase in the zoom ratio, for the purpose of letting them have a high value added. Because of this, if no auxiliary light source is used in shooting the camera, the exposure time has to increase when the lighting situations are equivalent to those heretofore encountered. As the image shake is liable to occur, the photographer will often fail to get the pictures he or she intends.

To save such situations, the camera is usually provided with an illumination device (flash device) as incorporated therein. For the reason described above, the frequency of using the flash device has been far more increasing than was heretofore possible, and the required amount of flash light for one shot has tended to increase.

In other words, suppose, in the lighting situations which are usually encountered, for two shots to take, the flash device is fired once, then the electric energy used up in this illumination accounts for about 80% of the total sum of energy the camera has consumed in carrying out all operations.

The increase of the frequency of firing the illumination device as described before accelerates increase of the ratio of the electric energy the illumination device consumes to that required to operate the whole apparatus. As the taking lens becomes darker, a larger amount of flash light is necessary to photograph a subject at an equivalent distance under an equivalent illumination.

On the other hand, along with the tendency to minimize the size of the camera, there are demands for reducing the size of the illumination device to a compact form. Accordingly, the problems of the illumination device of this character have become severer than were not so far found.

Under such a background, Japanese Laid-Open Patent Application No. Hei 4-138438 has made a proposal for using an optical member as arranged in front of a flash discharge tube. This optical member is provided with two surfaces, upper and lower, by which the rays dispersing sideways from the flashtube are brought to the entrance surface, and then totally reflected, thus being condensed to a certain direction. Besides this, at the front, there is a surface having a positive refracting power for condensing the light beam.

After the dispersing beams are condensed by the respective surfaces, they emerge from a common exit surface. In this proposal, concerning the beam condensation in the longitudinal direction of the flashtube, nothing particular is suggested.

To improve this proposal, Japanese Laid-Open Patent Application No. Hei 8-262537 employs a Fresnel lens in the exit surface, thus showing a method of condensing the light beam in the longitudinal direction of the flash discharge tube. In the illumination device of the character described, the optical system has to be reduced in size extremely. For this purpose, the Fresnel lens is merely employed. However, it is difficult to produce a good effect of condensing the light beam.

In more detail, the Fresnel lens is positioned at the front extremely closer to the light source than in the conventional method. Further, the space between them is filled not with the air as in the conventional example but with plastic or like optical material. For this reason, the optical path cannot be taken substantially long enough. So, it becomes impossible for the Fresnel lens to assure production of the necessary effect of condensing the light beam. Moreover, that part of the light which does not engage in the condensed light beam at the edges of the Fresnel lens increases, thus going to the outside of the intended angular field.

BRIEF SUMMARY OF THE INVENTION

The present invention is concerned with the illumination optical system in the photographic apparatus. The entirety of the illumination optical system is reduced to a compact size, while still keeping the optical characteristic as it stands. It is, therefore, an object of the invention to provide an illumination device which can increase the illumination, as the light beam is more effectively cast into the target area, and to provide a photographic apparatus using the illumination device.

To condense a light beam, there have been no methods except to increase the size. Another object of the invention is, therefore, to provide an illumination device which can remarkably improve the characteristics of condensing the light beam in the longitudinal direction of the light source (or along the axis of the flash discharge).

Still another object of the invention is to provide an illumination device which is reduced in size, is thinned in bulk and is made lighter in weight, while nonetheless making it possible to utilize the energy from the light source with a higher efficiency and, therefore, which is suited to still cameras, or video cameras, and to provide a photographic apparatus using the illumination device.

To attain the above objects, in accordance with an aspect of the invention, there is provided an illumination device, comprising light source means, and an optical member having an entrance surface which a light beam from the light source means is made to enter and an exit surface from which the light beam having entered the entrance surface is made to exit, wherein a plurality of prism portions are arranged at the exit surface of the optical member, and wherein a part of the plurality of prism portions totally reflect a part of the light beam having entered the entrance surface.

Further, in the illumination device, the part of the plurality of prism portions are prism portions corresponding to a central region of light emission of the light source means.

In particular, an apical angle θ of each of the plurality of prism portions lies within the following range:

$$2\times\{\sin^{-1}(1/n)\} \leq \theta \leq 90° + \sin^{-1}(1/n)$$

where n is a refractive index of material of the plurality of prism portions.

Further, a pitch interval of the plurality of prism portions is not less than 0.2 mm and not more than 2 mm.

Further, the optical member further has an additional entrance surface and a total-reflection surface which totally reflects a light beam having entered the additional entrance surface to lead the light beam to the plurality of prism portions.

Further, the plurality of prism portions have different apical angles for every different region thereof, and the prism apical angle in a central region is larger than the prism apical angle in a marginal region.

Further, the light source means has a tube-like shape, and the plurality of prism portions are formed such that a ridgeline forming each apical angle of the plurality of prism portions is approximately perpendicular to a longitudinal direction of the tube-like shape.

Further, the light source means has a tube-like shape, and the plurality of prism portions are formed such that a ridgeline forming each apical angle of the plurality of prism portions is inclined to a predetermined angle which is within a range of 45° to 90° with respect to a longitudinal direction of the tube-like shape.

Further, the light source means has a tube-like shape, and a reflector of approximately cylindrical shape is disposed immediately behind the light source means.

Further, the reflector has a cylindrical surface and a flat surface, and the flat surface is in contact with the optical member.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.
(First Embodiment)

FIGS. 1 to 5 show the main parts of an illumination device for photography according to a first embodiment of the invention. In the perspective view of FIG. 1, the illumination optical system includes light source means 1 in the form of a straight-tube-like flash discharge tube.

A reflector 2 encloses the rear half of the flash discharge tube 1 so that the ones of the rays of flash light which do not go to the target area are brought forward, as its inner surface is coated with a metallic material of high reflectivity such as bright aluminum.

An optical member 3 is positioned in a flood of light from the flash discharge tube 1. This light comprises a direct light beam from the flash discharge tube 1 and an indirect light beam as reflected from the reflector 2. These two beams, when exiting, are combined in a condition of uniform dispersion vertically (in a Y direction) and horizontally (in an X direction). For this purpose, the optical member 3, though taking the form of a single unit, is made most appropriate in shape to control the vertical and horizontal dispersion at once and is made up from acrylic resin or like optical resin material of high transmissivity.

In the following, the optical system of the illumination device is described about the form thereof in great detail by using FIGS. 2 and 3 for the radial cross-section (taken along the Y axis) of the flash discharge tube 1 and FIGS. 4 and 5 for the axial cross-section (taken along the X axis). Along with this, the behavior of the rays of light is described also in great detail.

Figure 2:
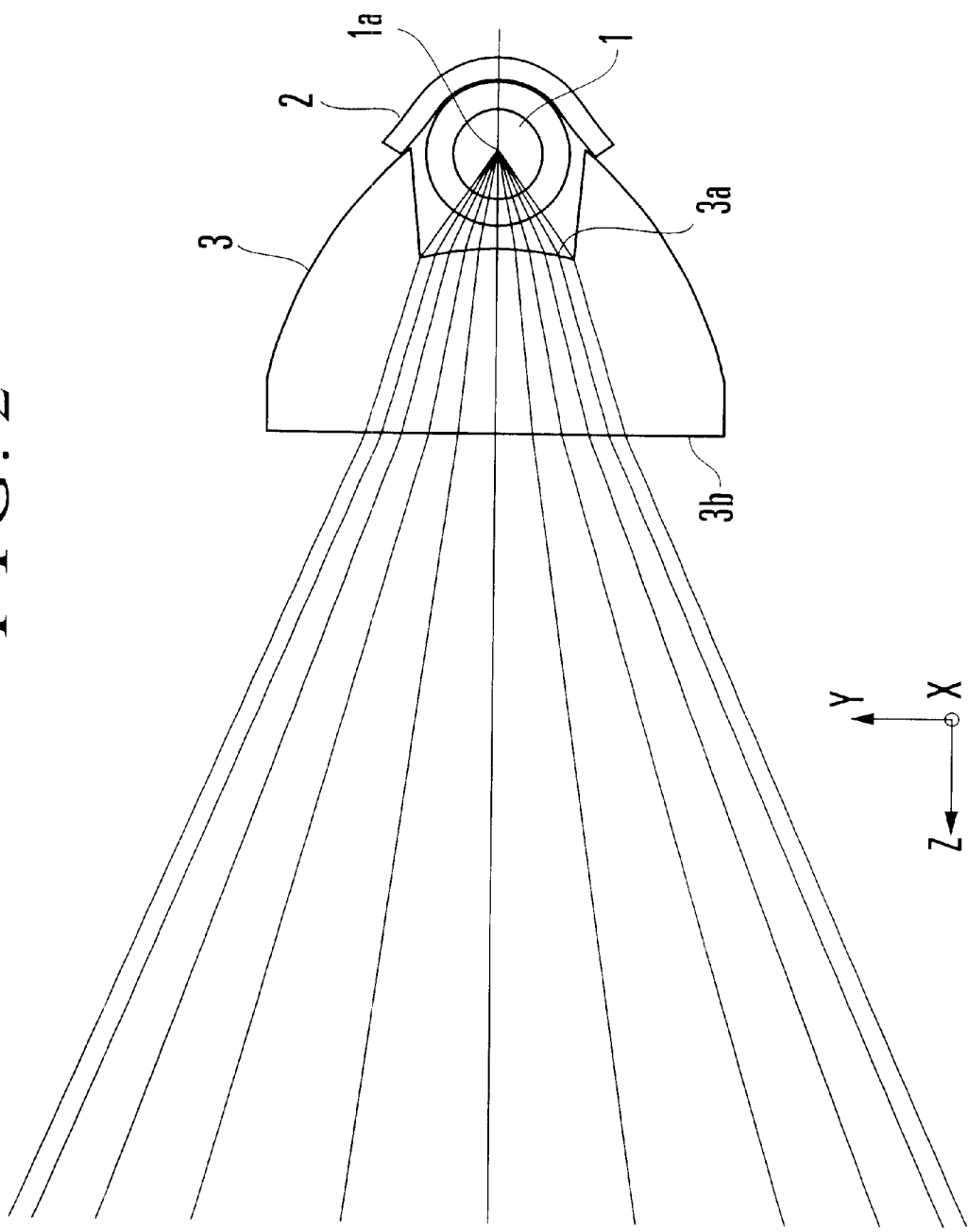
FIG. 2 is a sectional view in radial directions of a flash discharge tube with dispersion of some rays of light shown in the first embodiment of the invention.

Referring first to FIG. 2, the flash discharge tube (light source 1), though emitting light to all directions, is illustrated with main rays which go directly to the subject of photographic interest. For the purpose of making clear the explanation, the rays are depicted as emerging from almost the center of the light source.

As shown in FIG. 2, the rays dispersing from the core 1a are refracted and condensed by an aspheric toric lens surface 3 (hereinafter referred to as the first entrance surface). Then, an exit surface 3b refracts them so that the emerging light covers a required target area with good efficiency.

It should be noted here that the surface 3a is not simply cylindrical but aspherical in such a shape that the refracting power becomes progressively weaker toward the margin.

In more detail, on looking at the light beam issuing from the core 1a of the flash discharge tube 1, as the dispersing rays have their angles of emergence varying at a constant rate, such an aspheric toric lens surface 3a allows them to pass through the optical member 3 at different angles by the corresponding amount to this rate. Therefore, the rays are condensed at a constant rate so that, after having exiting from the optical member 3, the luminance becomes uniform over the entire area of the cross-section of the light beam.

Because of this, the intensity distribution over all the angles of incidence is so modified in passing through the optical member 3 as to make uniform the illumination distribution. It should be also noted that the light exit surface 3b has prism surfaces formed therein as will be described more fully later. However, the light exit surface 3b has no power in the radial direction, giving almost no influence to the illumination distribution in that direction.

Meanwhile, the flash discharge tube 1 and the entrance surface 3a for the direct light beam of the optical member 3 are put very closely to each other. The reason for this is to reduce the entire size of the illumination optical system down to a limit. By narrowing the distance to the entrance surface 3a, the apparent size of the light source can be made smaller, thus assuring reduction of the entire physical size to a compact form.

However, actually, the light source 1 generates heat, too. So, if the optical member 3 is made up from plastic material, the influence of heat lays limitations on the reduction of the distance. In the first embodiment, by reckoning backward from the energy necessary to fire the light source, it has been found that this distance can be reduced extremely to a value ranging from 0.3 mm to 0.7 mm.

Figure 3:
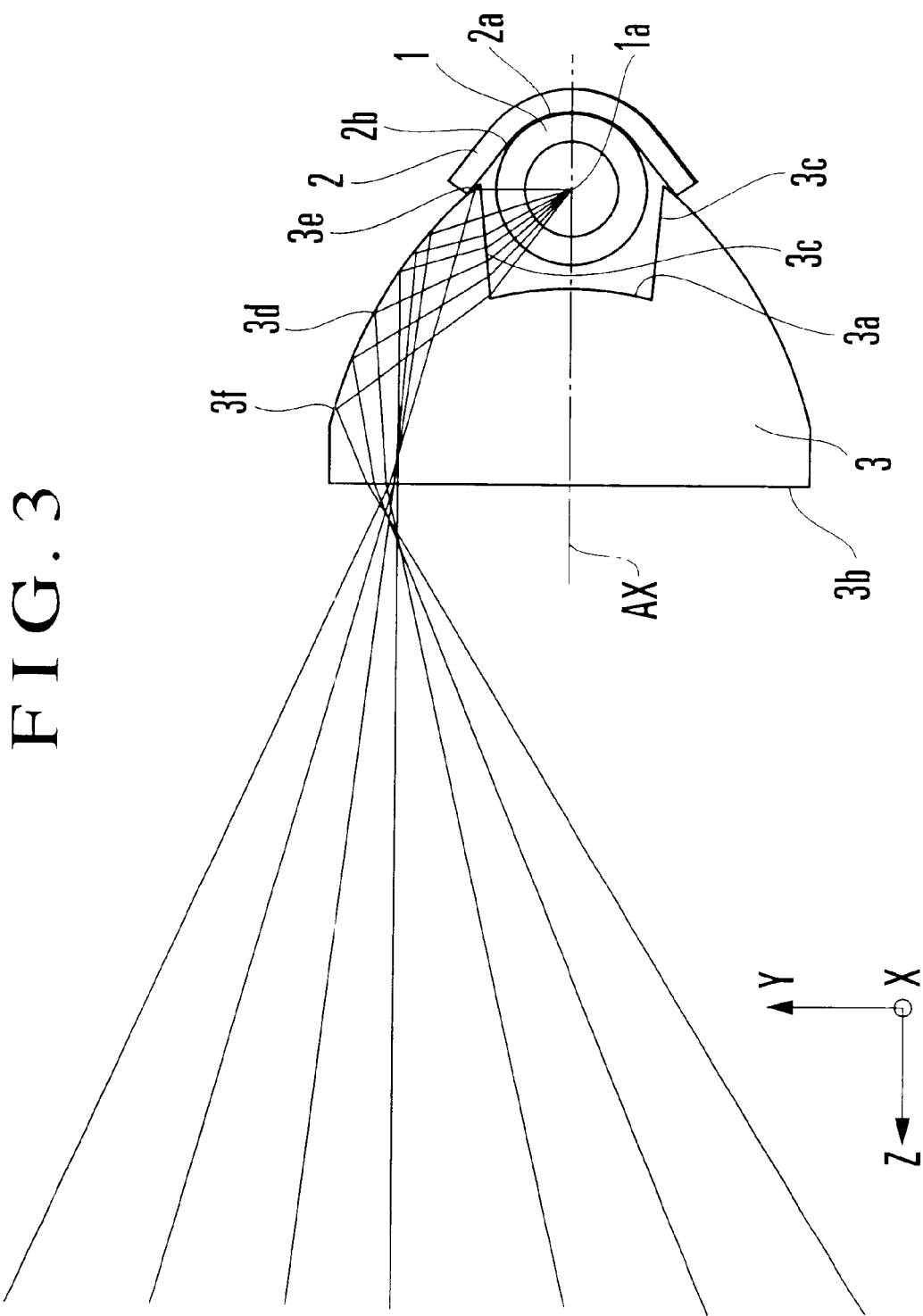
FIG. 3 is a sectional view in radial directions of the flash discharge tube with another dispersion of some rays of light shown in the first embodiment of the invention.

Referring next to FIG. 3, the flash discharge tube 1 radiates additional rays dispersing sideways at large angles with the optical axis AX (or the Z axis). Tracing of these rays is explained below.

In FIG. 3, differing in orientation largely from the entrance surface 3a, other or second entrance surfaces 3c, left and right, are formed to plane shapes. At first, the rays from the flash discharge tube 1 are largely refracted in passing through this entrance face 3c, going away from the optical axis AX.

This produces an advantage of shortening the entire optical system in the axial direction. Therefore, the bulk and size of the optical system can be greatly reduced to a compact form. In the first embodiment, these entrance surfaces 3c are set up as inclined to the optical axis AX by a predetermined angle θ. The reason for this is to sustain the precision accuracy of the entrance surfaces 3c. To this purpose, the draft taper on molding is taken into account. Ideally speaking, the surfaces 3c are rather better made to approach to the exact parallelism with the optical axis AX as far as possible, so that the refracting effect becomes greater. This is advantageous at minimizing the size in the axial direction. An ideal value of the angle θ is desired to be 2° or less.

Then, the rays once refracted at these entrance surfaces 3c go to, and reflect from, curved surfaces 3d (reflection surfaces on the upper and lower sides) in the outer periphery of the optical member 3. Here, the reflection surfaces 3d are not coated with metal of high reflectivity such as aluminum or silver by the vacuum evaporating technique, but are mirrored by their resin material only. For this reason, as compared the reflective coating of metal, the production cost is very inexpensive. Further, since the light control is possible by utilizing the total reflection, there is no light loss which would otherwise result from the use of the metal coating due to the imperfection of the reflectivity. So, the dispersion of the rays can be controlled with very good efficiency.

Here, what is characteristic of this total reflection surface 3d is that a light beam that comes from the core 1a of the flash discharge tube 1 and reflects therefrom goes as follows. For the nearest point of reflection to the flash discharge tube 1 (like that shown by 3e in FIG. 3), the reflected ray directs itself away from the optical axis. For the farthest point of total reflection (like that shown by 3f), the reflected ray advances in such a direction as to cross the optical axis.

As the point moves from one end to the other, the angle of reflection varies continuously. As a result, the rays are so dispersed that the required range of targets is illuminated almost uniformly.

In other words, these total reflection surfaces 3d, similarly to the aspheric toric lens surface 3a shown in FIG. 2, are made to have such a shape that the distribution of the angles of incidence of the rays on the surfaces 3c is retained at a constant rate, when condensing the light beam. Therefore, even after the rays have exited from the optical member 3, the angle distribution that has occurred at the time of incidence is retained at a certain rate.

Also, as described in connection with FIG. 2, too, a great number of prisms are formed in the exit surface 3b, but have no powers in the vertical cross section. So, the rays are little influenced, refracting as they are, and being let to go on exiting.

As is understandable from FIGS. 2 and 3, the front half of the light issuing from the core 1a of the flash discharge tube 1 comprises the direct light of FIG. 2 and the indirect or reflected light of FIG. 3. Although differing in the optical path, they illuminate almost common an area, and their illumination distributions each become nearly uniform. Actually, they are combined to obtain an illumination distribution which, too, is very uniform over the entire target area. Also, by optimizing the shapes of the refracting surface and the total reflection surfaces, the target area for the indirect light can be brought into exact coincidence with that for the direct light. Otherwise, in combining them, an unnecessary fraction of illumination would be produced as falling outside the required target area. According to the invention, this component is as far reduced as possible, thus obtaining an illumination optical system of lesser energy loss for good efficiency in an extremely improved compact form.

Next explanation is given to the basis on which to make determination of the shape of the reflection surfaces 3d with the results like those described above. To make up a light condensing optical system (the illumination optical system) of compact form with good efficiency, it is at first desirable that, without relying on the reflector 2 behind the flash discharge tube 1, the light distribution of the optical system is controlled by utilizing the total reflection of the optical member 3 arranged at the front as far as possible.

That is, it is desirable to extend the rear end 3e of the optical member 3 to more rear positions in order to expand the total reflection domain 3d of the optical member 3. Actually, however, there are some cases that the extended domain does not fully satisfy the condition of total reflection. Therefore, it cannot be expanded endlessly.

Also, to moderate this condition, the entrance surfaces 3c may be changed by bending their rear portions outwardly of the flash discharge tube 1, thus allowing the optical member 3 to extend its useful total reflection domain 3d to more rear positions. However, for the increase of the size, the beam-condensation efficiency is not so much improved. So, such a form cannot be said to be very appropriate.

For this reason, in the first embodiment, the entrance surface 3c is left flat and extended to a limit of no appreciable light loss or a point just right to the central axis 1a of the flash discharge tube 1. For the more rear part than that, the reflector 2 is used to control the beam condensation.

That is, in the first embodiment, to assure minimization of the bulk and size and uniformity of light distribution, an arrangement is made such that this optical member 3 satisfies the condition of total reflection even at the rear part thereof. Further, the shape of the total reflection surfaces 3d is determined so that a marginal ray impinging on the point 3e is totally reflected and, after refracted in passing through the exit surface 3b, goes to a maximum angle in coincidence with the maximum angle at the upper end of the required illuminating range. Another marginal ray which makes a maximum angle with the first marginal ray, as is regulated by the front edge of the entrance surface 3c, goes to an angle almost coincident with the maximum angle at the lower end of the illuminating range. An illumination optical system of minimum size with highest volume efficiency is thus realized.

In addition, between the points of reflection of the two marginal rays, the reflection surface 3d is curved so gradually that, as the point moves from one end of the range to the other, the angle of reflection varies at a constant rate. Therefore, the optical system provides uniform illumination and uses light unwastefully for good efficiency. Another feature is that the optical member 3 has an outer contour with a largest curvature taken in the rear end and, as going from the neighborhood of the exit aperture to the rear, the curvature becomes progressively gentler. This produces many advantages. For example, a minimum size can be taken to obtain an equivalent beam condensibility.

In the optimized optical system as that shown in FIG. 3, if the optical member 3 is arranged with its rear end 3e nearly in lateral alignment with the central axis 1a of the flash discharge tube 1, good balance can be taken between the size and the performance so that the unification is best.

Whilst the example of ray tracing shown in FIG. 3 is concerned with the forward going beam from the light source 1, the rearward going beam is described in detail below. For the reflector 2, its shape in the radial cross section is such that the paraxial zone 2a just behind the light source 1 is cylindrical with its axis at the central axis of the light source 1.

For this reason, the ones of the rays emerging backward from the light source 1 which make angles of less than 45 degrees or so with the optical axis AX are returned along the same paths of emergence and enter the flash discharge tube 1 again. After having passed through the flash discharge tube 1, they travel on almost the same path as the direct light described before in connection with FIG. 2, reaching the target area.

The reflector 2 has also two flat side zones 2b contiguous to the cylindrical paraxial zone. These side zones 2b are extended so as to enclose the back of the end portions 3e of the total reflection surface 3d.

This is because the use of the paraxial zone alone, though providing a uniform light distribution, is difficult to raise the illumination in the central region of the target area. The flattening of the rear side zones 2b of the reflector 2 makes it possible to supplement the light amount in the central region.

With such a form in use, the gaps between the flash discharge tube 1 and either of the upper and lower shoulders of the optical member 3 are covered to save the light loss due to the leak through the gaps. Moreover, as the flat portions 2b are positively extended, mainly that part of the forward light beam from the flash discharge tube 1 which fails to totally reflect from the surface 3d and tends to escape to behind the optical member 3 is caught and returned by reflection to enter the optical member 3 again, giving an advantage of effectively utilizing the flash light.

Although the first embodiment has been described in connection with the representative light beam, or the one which issues from the core of the flash discharge tube, the real phenomenon is that flash light emits also from the outside of the core. By this fact, the actual light distribution widens in such a fashion as to have slightly even more skirts. Since the basic light distribution characteristic is, however, governed by the dispersion of the light beam issuing from the core of the light source, it is in actual practice that a uniform light distribution as that described above can be realized.

Employing the above-described characteristic features, the novel illumination optical system has succeeded in more shortening the maximum length from the rear vertex of the reflector to the front surface to 4.9 mm than was heretofore impossible, while still permitting the beam to be condensed with good efficiency. The vertical length or height, too, despite the vertical expansion of the optical path, is so much shortened as is impossible to achieve by extension of the conventional concept on the reflector of the flash device. Therefore, within a very narrow range, say, vertically 6 mm, the beam can be condensed with good efficiency.

Figure 4:
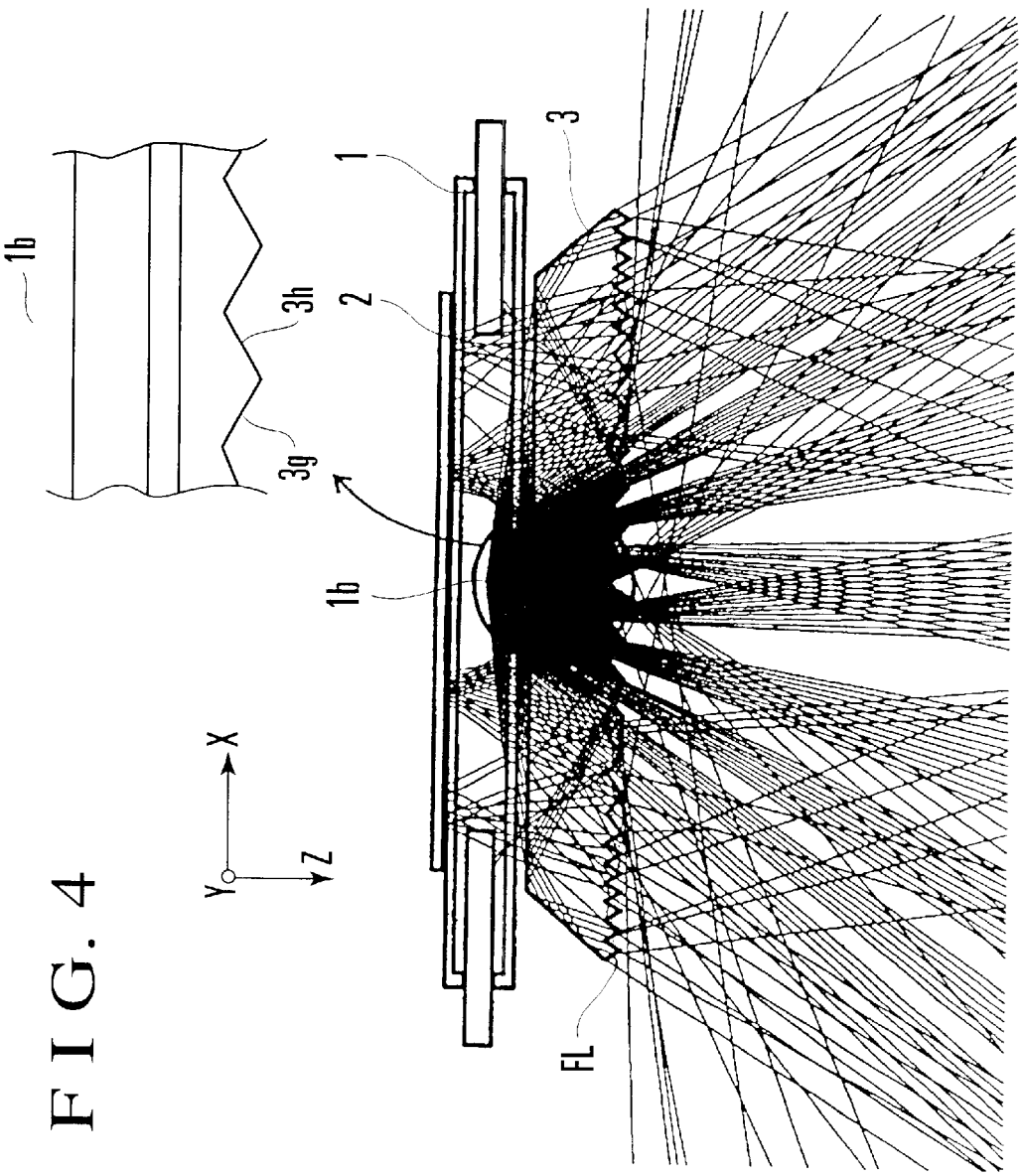
FIG. 4 is a sectional view in axial directions of the flash discharge tube in the first embodiment of the invention, showing dispersion of the rays of light from the center thereof.
Figure 5:
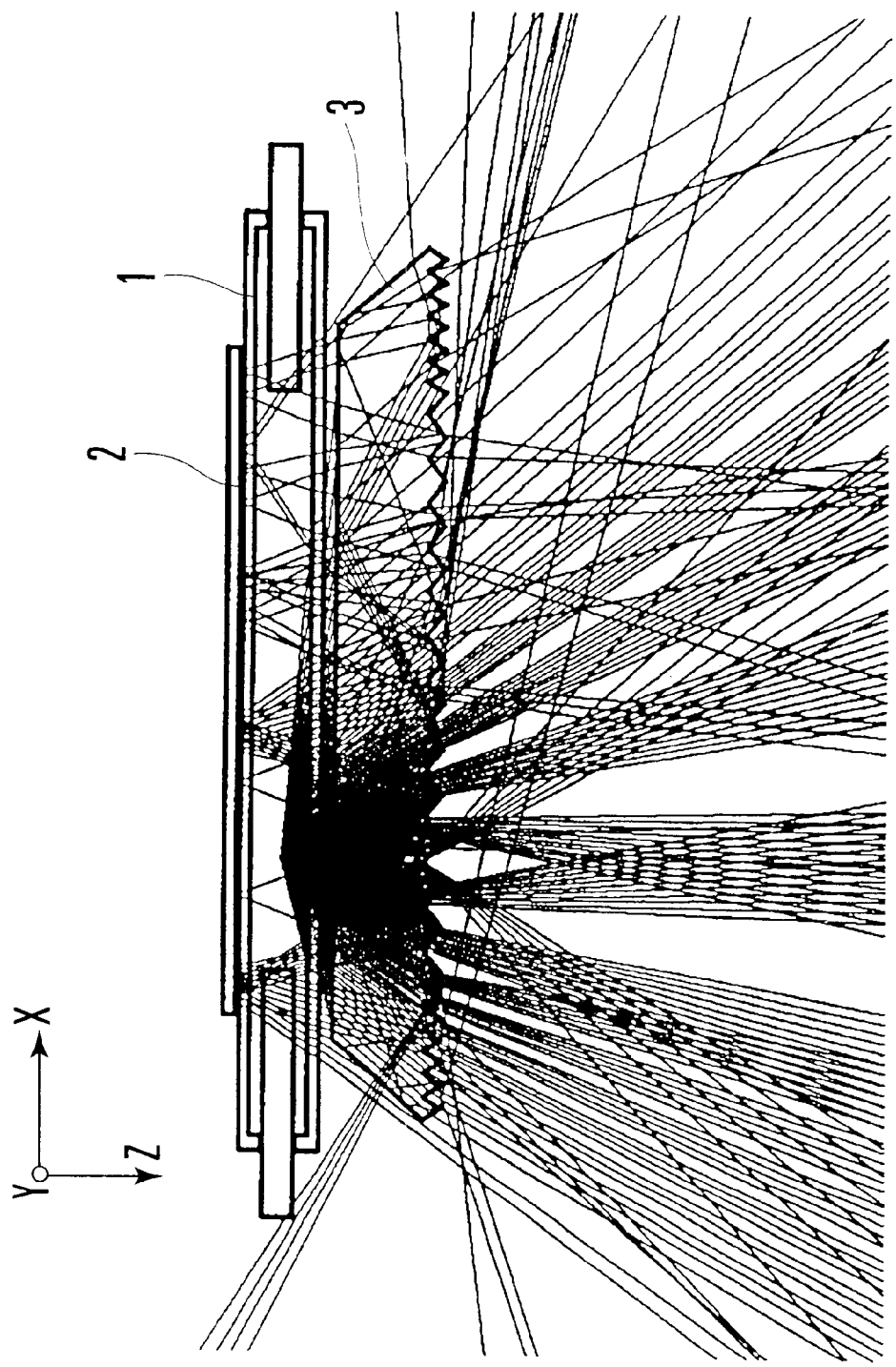
FIG. 5 is a sectional view in axial directions of the flash discharge tube in the first embodiment of the invention, showing another dispersion of the rays of light from the marginal portion thereof.

Next, using FIGS. 4 and 5, what is most ideal in the first embodiment of the invention is explained by choosing representative points on the profile in the axial cross section of the flash discharge tube and tracing the rays therefrom.

In FIG. 4, for the purpose of ease of explanation, the rays of light issuing from the core of the flash discharge tube 1 are traced in only that part which does not go to the paraxial zone of the rear reflection surface. That is, only the direct light beam is traced. FIG. 5 is similar to FIG. 4 except that the rays are dispersed from a point farther away from the center of the length of the flash discharge tube.

At first, the cross-section taken along the axis of the flash discharge tube 1 is, as shown in these figures, largely different from that of the Fresnel lens which has been widely used in the prior art to condense the light beam in the axial direction of the flash discharge tube of the kind described above.

Figure 22:
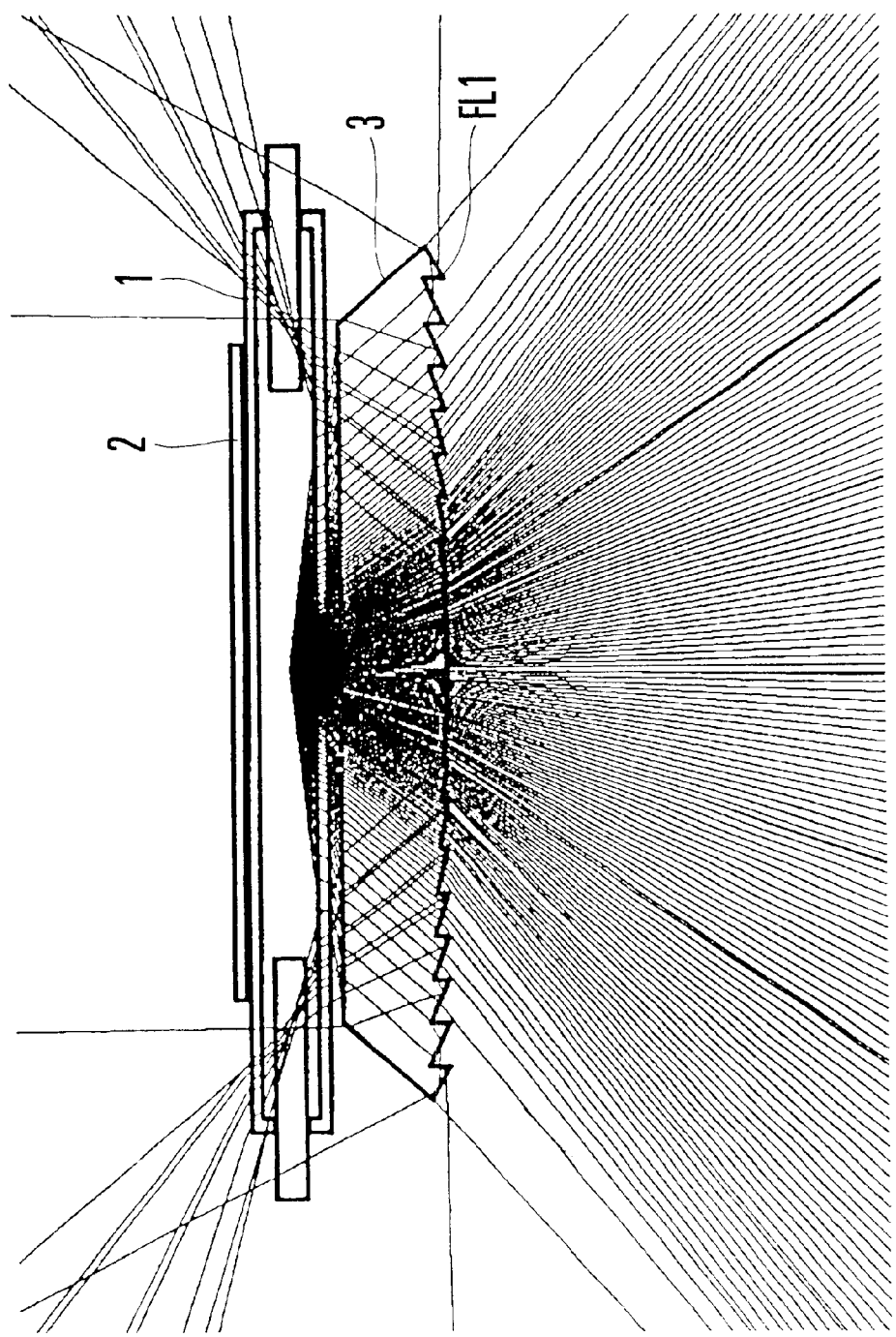
FIG. 22 is a sectional view in axial directions of a flash discharge tube in a conventional example, showing dispersion of the rays of light from the center thereof, for the purpose of better understanding the invention.
Figure 23:
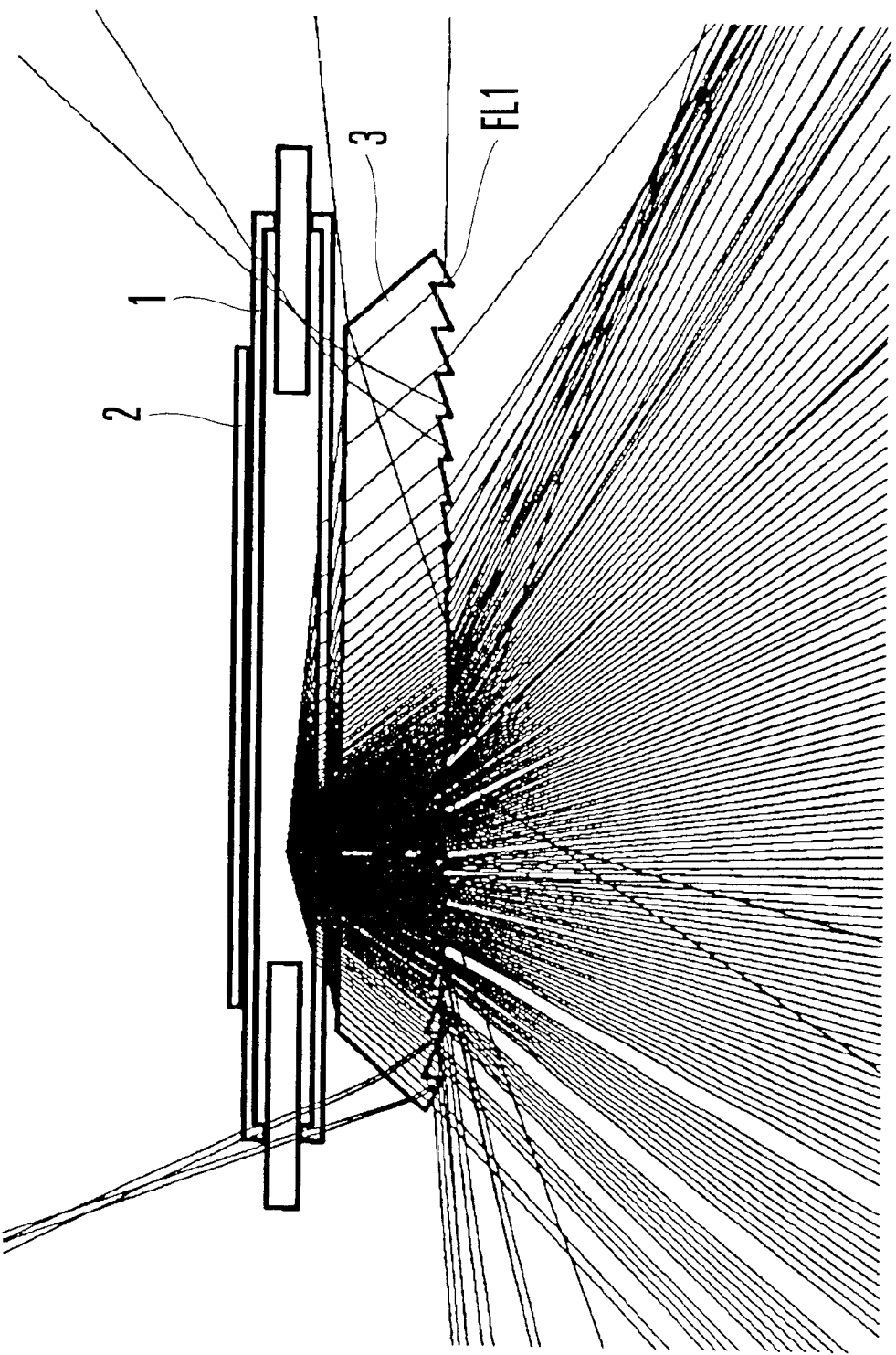
FIG. 23 is a sectional view in axial directions of the flash discharge tube in the conventional example, showing another dispersion of the rays of light from the marginal portion thereof, for the purpose of better understanding the invention.
Figure 24:
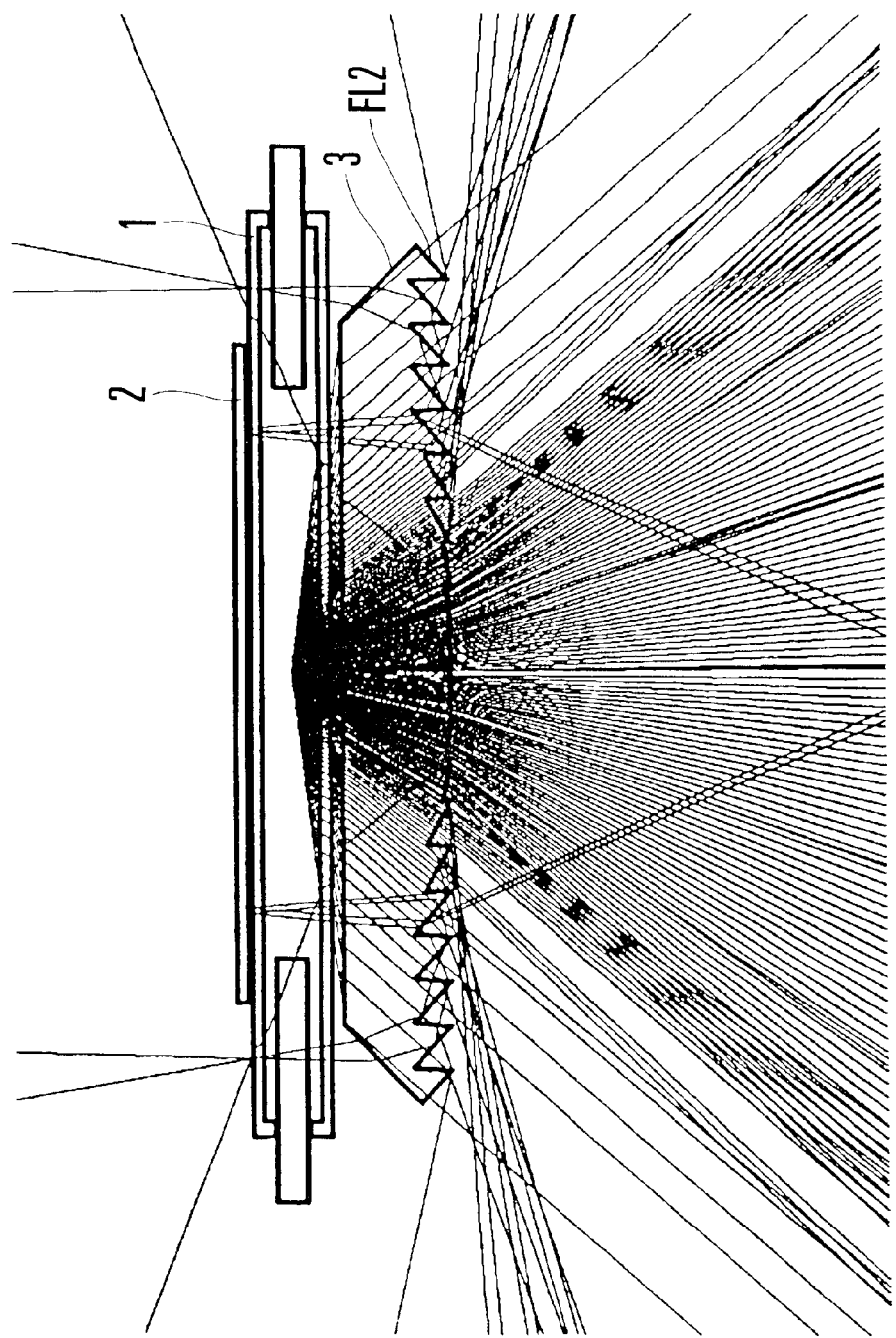
FIG. 24 is a sectional view in axial directions of a flash discharge tube in another conventional example, showing dispersion of the rays of light from the center thereof, for the purpose of better understanding the invention.
Figure 25:
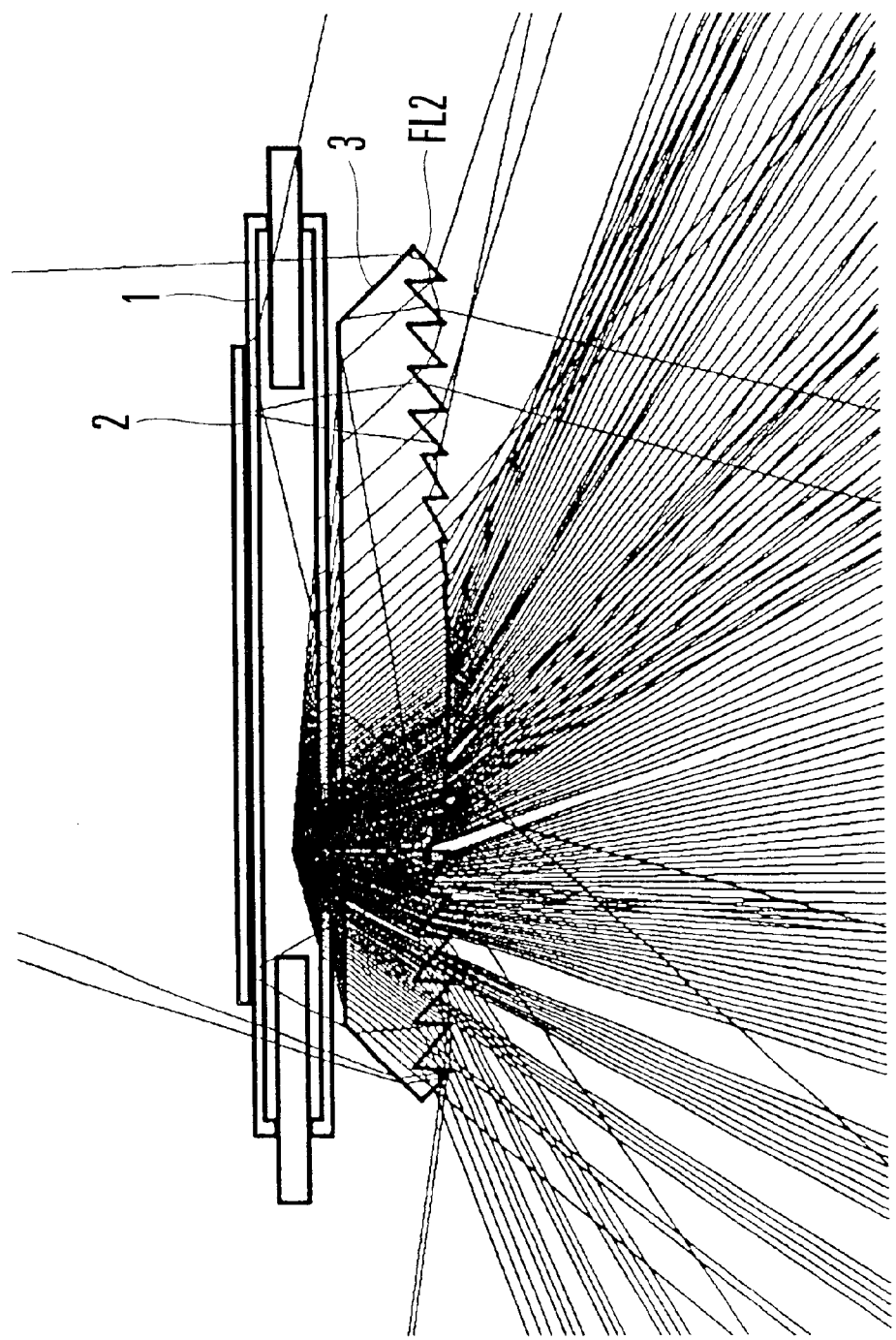
FIG. 25 is a sectional view in axial directions of the flash discharge tube in the other conventional example, showing another dispersion of the rays of light from the marginal portion thereof, for the purpose of better understanding the invention.

To make clear this difference, the other conditions are assumed to be exactly the same and reference is had to FIGS. 22 to 25 for examples of changing only the front surface of the optical member to the Fresnel lens. FIGS. 22 and 23 show a case that a Fresnel lens (FL1) of relatively weak power is formed in the front surface. FIGS. 24 and 25 show another case that the power of the Fresnel lens is strengthened, or, a Fresnel lens (FL2) is, according to the conventional concept, of the enhanced type in condensing the light beam. In each pair of these figures, light emerges from different points corresponding to those in FIGS. 4 and 5.

Figure 1:
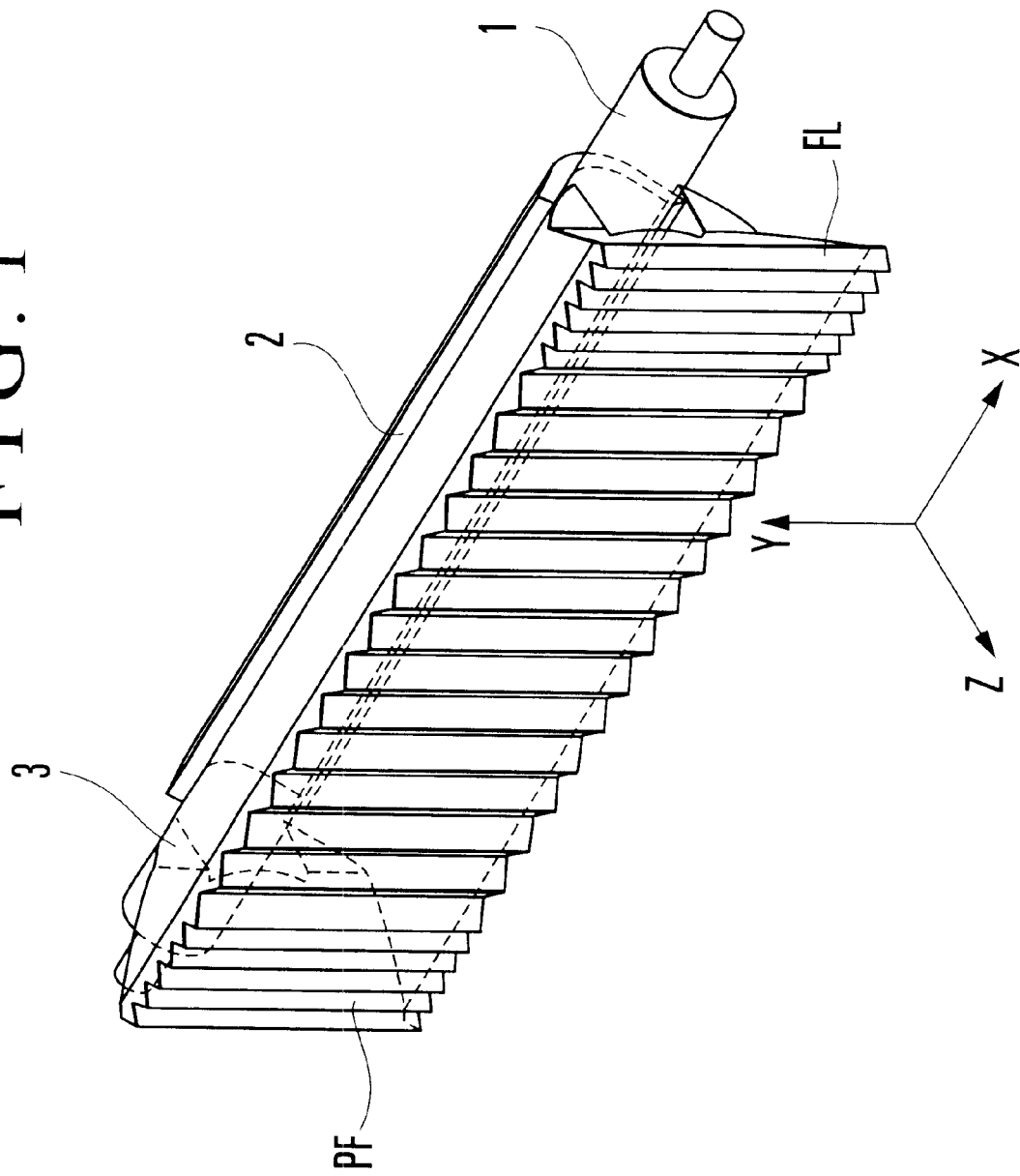
FIG. 1 is a perspective view of the main parts of an illumination device for photography according to a first embodiment of the invention.

In FIG. 4, the optical member 3 has an array of prisms PF (see FIG. 1). For a central area, as is understandable from FIG. 1, too, every prism has its confronting faces extending outwardly of the common base plane at almost equal angles to each other. A number of such prisms of almost the same shape are arranged side by side horizontally (or in the X axis.)

In the example of FIG. 4, the prism surfaces are formed to an apical angle of around 104°. This shape repeats itself continuously over a length corresponding to the length of an arc of the flash discharge tube 1. For the marginal areas on the outside of the arc, each prism surface makes a larger angle with the base plane than that for the central area. In the same example, the apical angle is 60°.

The thus-formed prism surfaces condense the light beam from the flash discharge tube 1 in a better way than the conventional art. As can be seen from the example of FIG. 4, what contributes to the beam condensation is mainly that face 3g which inclines inward as viewed from a firing point 1b. Fundamentally, with the opposite face 3h which orients outward as viewed from the firing point 1b, the incident light refracts in only that part which comes from the axial center of the core. The major part is totally reflected from the prism surface 3h.

Then, a fraction of the totally reflected part exits from the back of the optical member 3. After having reflected from the reflector 2, it enters again the optical member 3 and then exits therefrom to the subject. In short, even the totally reflected light from the outside prism surface 3h is saved in part to thereby increase the efficiency.

The remaining fraction, after having totally reflected, goes to the outside of the necessary illumination angle, getting lost. As is understandable from the diagram of ray tracing, though there is more or less a fraction of light going to the outside of the target area, for all angles of incidence on the optical member, the dispersion of the rays falls within a certain range. The light beam is thus condensed with a relatively good efficiency.

It should be noted here that, in the diagram of FIG. 4, the traced rays are depicted in respect to both prism surfaces 3g and 3h of every prism. The inward oriented faces refract a fraction of the light, so that this fraction condenses effectively. The other fraction which impinges on the outward oriented faces drops out. Since the opposed faces alternate each other, a number of voids are created throughout the entire light dispersion. Hence, FIG. 4 looks as if an uneven light distribution were obtained.

In the real phenomenon, however, the flash discharge tube 1, when fired, shines almost uniformly over the entire length of the effective arc. So, for another point of issuing light as displaced by a half pitch from that chosen just above, the angle-dependent voids that have been created in every pitch by the above-described cycle of ray tracing are successively filled in. It is thus made possible to achieve an uniform light distribution.

It should also be noted that the beam condensing action such as that described above depends only on the angles of the prism surfaces 3g and 3h in the front surface, and does not depend on the magnitude of the pitch, the distance from the light source to the prism and others. For this reason, the pitch may be made finer so that the valleys between any adjacent two of the prism become shallower in depth. By employing such a finer prism pitch, it is made possible to utilize the upper and lower total reflection surfaces shown in FIGS. 2 and 3 effectively up to a maximum.

The first embodiment is put into practice under a condition that all the valleys become almost constant in depth. The prisms in the central region have an obtuse apical angle of 104°. The prism pitch is taken at 1 mm. For both marginal regions, the apical angle is made as acute as 60°. The prism pitch is, therefore, determined to be 0.5 mm.

Usually, the optical member 3 is provided with a relief in the vicinity of the side edges of the exit surface 3b so that the exiting light does not interfere with an outer appearance member. If the valley is so much shallower as such, the outer appearance member may be given a lesser relief. Even if so, the light loss can be reduced. Therefore, the degree of freedom of design can be increased.

Meanwhile, if the prisms are spaced too narrow in pitch beyond the limit of machining, the angles of the prism surfaces do not come out accurately on molding. That is, sagging of the faces occurs with a high possibility. So, that part of the area of the prism surface which accurately maintains the required angle for its action as the refracting surface is caused to decrease in proportion the sagged part. Also, even on molding, difficult conditions must be set forth. As a result, the products become expensive with some possibility.

In the first embodiment, these and other machining conditions are taken into account in determining the above-described spacing in pitch. Thus, the performance at the prism surfaces is maintained, the entire size is reduced to a compact form, and the relief does not take an awkward shape in the outer appearance.

Nonetheless, this spacing differs with different formabilities of the materials to be used. As the prism surfaces are exposed to the outer appearance, dust is apt to accumulate thereon, deteriorating the optical characteristics. Therefore, it also differs with different circumstances in which to use the apparatus. Further, depending on the material, the acute tips of the prisms will hurt the user's finger touching on it. To avoid this, the pitch must be made to reduce so much more.

To put the first embodiment into practice, whilst the other parameters take the values described before, what is substantially effective of the pitch is determined from the available machining techniques and their tolerances to be 0.2 mm at minimum, and from the regulation of the size of the products and the provision of the satisfactory relief for avoidance of vignetting by the outer appearance member to be 2 mm at maximum. These apply to the prisms in the central region which is aligned to the arc of the flash discharge tube.

Meanwhile, in the marginal regions aligned to the outside of the arc, the prisms are made to have a very acute apical angle as that shown in FIG. 4 as compared with the central region. The reason for this is that the rays which go to one of the marginal regions of the optical member 3 can be regarded as a light beam of constant direction, because most of them have angles of emergence toward the outside of the target area. To turn them to the required directions of illumination, a high refractive power must be given to the prisms.

The refracting one of the prism surfaces, say the prism surface 3g, at a steep angle with the prism base as that shown in FIG. 4 gets so much high a refractive power. Along with this, the opposite surface 3h is relieved by a certain angle so that the light having emerged from one of the surfaces of a prism is prevented from entering the next prism at the opposite surface thereof. This contributes to realize an optical system of lesser loss.

In more detail, the rays that have entered the optical member 3 at the entrance surface 3a are first refracted by the entrance surface 3a.

For this reason, only those rays which have very large angles of incidence on the entrance surface 3a can reach the marginal regions where the apical angles of the prisms are acute. To condense such rays with a good efficiency, the inward oriented surfaces 3g in the left marginal region have to take a steep inclination as adapted to these rays only.

In this connection, it is to be noted that, assuming that the ordinary Fresnel surface is used instead of the optical member 3, some of the rays, after having refracted at the corresponding surface to the prism surface 3g, impinge on the confronting surface with it. In the prior art, therefore, the impinging rays, though being converted to illuminate the target area, go astray to the outside of the required range of illumination with a possibility.

On this account, in the first embodiment, the rays emerging from the very refracting surface must be prevented from entering the next prism at the confronting surface with it. For this purpose, this confronting surface is made to have a certain angle.

As the integrated form, therefore, a group of steeper prisms than those in the central region of the exit surface 3b are necessarily made up.

Although the first embodiment has so far described in connection with two types of prisms, one of which has a relatively obtuse apical angle as positioned in the central region, and the other of which has an acuter apical angle of 60° as positioned in the marginal regions, it is to be understood that the invention is not confined thereto. For example, these two regions may be separated by an intermediate region where the apical angle varies gradually. Depending on the angle distribution of the rays reaching the prisms, the refracting surfaces are optimized. The back faces, too, are made to have gradually varying angles so as not to affect the rays emerging from the refracting surfaces. Such an arrangement is considered to be ideal.

Referring next to FIG. 5, rays issuing from a point near either end of the flash discharge tube 1 are traced.

As can be seen from FIG. 5, the ones of the rays which go to the central region for the obtuse apical angle display exactly the same characteristics as those of the rays issuing from the central point. Further, the other rays which go to the marginal region emerge to the required range of illumination almost without any loss.

The illumination optical system of the first embodiment has a high directivity in the horizontally marginal regions. The proportion of the fraction of light dispersing from the marginal region to the target area is so much greater than that from the central region. The effective range of illumination is almost the same in both of the central and marginal regions. As it uses the acute apical angle, the marginal region becomes possible to control the condensation with so much better efficiency.

In any case, the range to be illuminated depends on the prism angle in the front surface 3b, being hardly influenced by the pitch and thickness of the prisms. Nonetheless, speaking from the point of view of improving the effectiveness of utilizing the prisms of steep angles in the marginal regions, the thicker the thickness of the prisms, the larger the effective area of the prism surfaces becomes. Therefore, a light dispersion of higher directivity can be obtained.

Next, the above-described optical member 3 is compared with a case that the prism array is replaced by a Fresnel lens FL of that type which has found its use in many prior known illumination optical systems. FIGS. 22 and 23 show the Fresnel lens FL1 of relatively weak refractive power, and FIGS. 24 and 25 show the Fresnel lens FL2 of relatively strong refractive power.

This arrangement differs from the conventional one in a point that the Fresnel lens is abnormally close to the light source 1. More properly speaking, in addition to the fact that the distance from the light source to the Fresnel lens is very short, the plastic material is filled in the space therebetween. The substantial length of the optical path is, therefore, made even shorter by the amount equivalent to the refractive index of the filled-in material.

For this reason, as the flash discharge tube has a very long firing chamber in the axis thereof, this Fresnel lens cannot take the least optical path lens and, therefore, hardly functions as the lens. So, it is understandable that any effective light control cannot be made.

Notwithstanding, in the central region, there is seen some effect of condensing the rays as shown in FIGS. 22 and 24. The marginal regions, however, function in such a manner that, as can be seen from FIGS. 23 and 25, for a fraction of light going farther away from the optical axis, condensing is effected. However, for another fraction going toward the optical axis, on the contrary, they function to widen the light beam. As the light control is made contradictorily, the illumination scatters away. This tendency is intensified as the light originating point nears to the end of the light source. In conclusion, the use of the Fresnel lens does not lead to a possibility of so much more condensing the light beam.

On comparison of the two illustrated examples, at a glance, the power-strengthened one shown in FIGS. 24 and 25 looks to have a higher effect of condensing the light beam. In actual practice, however, such increase of the power causes increase of the possibility of the marginal rays being diffused by the Fresnel lens FL2. Because the condensation and diffusion in the central and marginal regions cancel each other, the light beam condensation cannot be always done with good efficiency.

In reality, such a prism array or Fresnel lens (of strong or weak power) is made up on the optical member 3 by varying only the form of its front surface. To quantitatively compare their effects, the light distributions over the entire axial length of the flash discharge tube are measured and graphically illustrated in FIG. 6. To make easy the evaluation of the results, an optical panel (optical member) whose front surface is deprived of the prism array or Fresnel lens, or a smooth plane surface is chosen as a reference. Then, the optical member 3 in the first embodiment and the above-described two control examples using the Fresnel lenses FL1 and FL2 are compared with the reference one.

Figure 6:
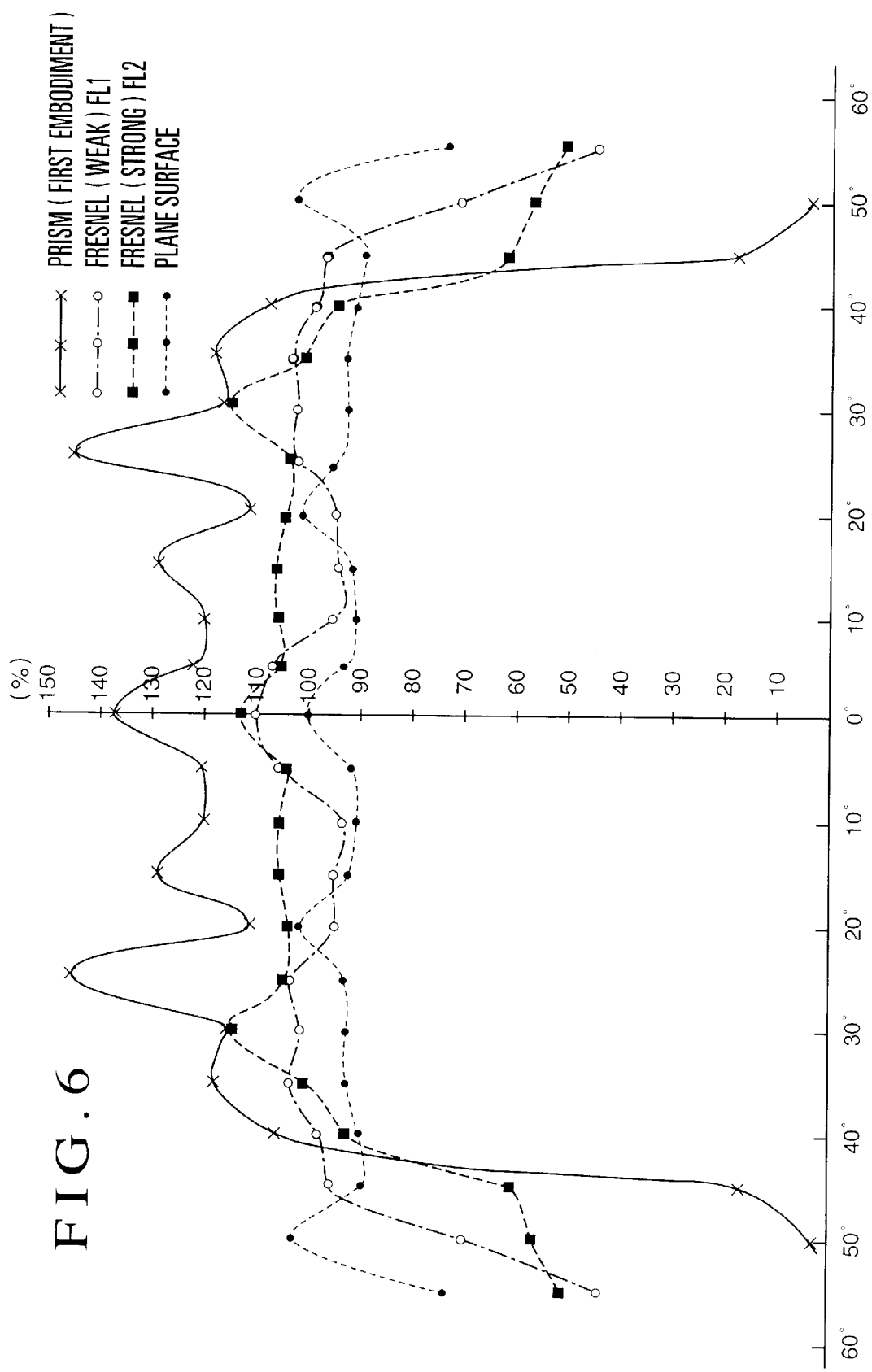
FIG. 6 is a graph of the light distribution characteristics in the axial directions of the flash discharge tube in the first embodiment of the invention, as compared with those of other states.

In the graph of FIG. 6, the ordinate is in the light amount with the smooth flat panel having a value of 100% at the center of the horizontal length thereof. The abscissa is in the angle from a center on the optical axis.

As is apparent from FIG. 6, in a case where the smooth flat panel is used instead of the optical member 3, the light distribution is nearly uniform over the entire range of angles illustrated here. Meanwhile, the first embodiment of the optical member with the prisms of two kinds, obtuse and acute, in the front surface thereof has a characteristic that the light amount at the center is highest among the compared values, or about 40% higher than that of the flat panel.

With regard to the angle of illumination, as the angle increases from 45°, the light amount starts to lower rapidly. This implies that the light beam is condensed to the required range of illumination with good efficiency.

Meanwhile, for the comparison purposes, the two Fresnel lenses of strong and weak kinds are also tested and their results are shown simultaneously. As is apparent from FIG. 6, as in the optical systems of this time, the Fresnel lens at the minimum distance to the light source, because of lacking a space for sufficient dispersion of the light from the light source, effects very thin condensing of the light beam.

Regardless of whether the Fresnel lens is strong or weak, the increase of the light amount at the center is around 10%. Also, the range of illumination is not sufficiently limited as compared with the first embodiment, being widened unintentionally.

It is understood from the foregoing that, in application to the beam condensing optical system of the type in which the distance from the light source to the control plane (the Fresnel lens plane) is short and the light source has a uniform luminance over a certain length, what is most appropriate to such a type is, like the form of the first embodiment, to make up a continuous succession of minute prisms of relatively moderate angles in a direction nearly perpendicular to the longitudinal direction of the effective firing face of the light source with an advantage of improving the effect of condensing the light beam.

Next, concerning determination of the angle of the prism surfaces formed in the front surface of the optical member 3 according to the first embodiment, its optimum values are explained. In the first embodiment, the prism surfaces formed in the front surface are determined to be 104°. By forming the prism surfaces in such a way, part of the incident light from the light source totally reflects from this prism surface, being lost for sure.

This fraction to lose must be reduced as far as possible, or part of the fraction to totally reflect must be used again in order to improve the efficiency. In this respect, determination of the angle becomes necessary to make.

At first, the former is explained with a method of reducing the light amount to lose. As a rule, if a special coating is not applied to the surface of each optical element, say the glass surface of the flash discharge tube and the entrance surface of the optical member, most of the rays which are to impinge on the entrance surface of the optical member at steep angles are lost by the surface reflection before they reach the prism surfaces of the front surface.

In actual practice, for the illumination optical system like that of the first embodiment, in view of the cost, it is rare to use such an expensive coating. With the elements of no anti-reflection coatings, an incident component of such steep angles is almost absent, or even if present, very little.

For this reason, even if this component is controlled to the required range of illumination angles by the front surface 3b or the prism surfaces FL of the optical member 3, an appreciable increase of the light amount is not much desired. So, ignoring this component of no effective use from the beginning, it is desirable that the angles are determined so as to be as steep as possible provided that the light loss is not influenced by the surface reflection.

Figure 7:
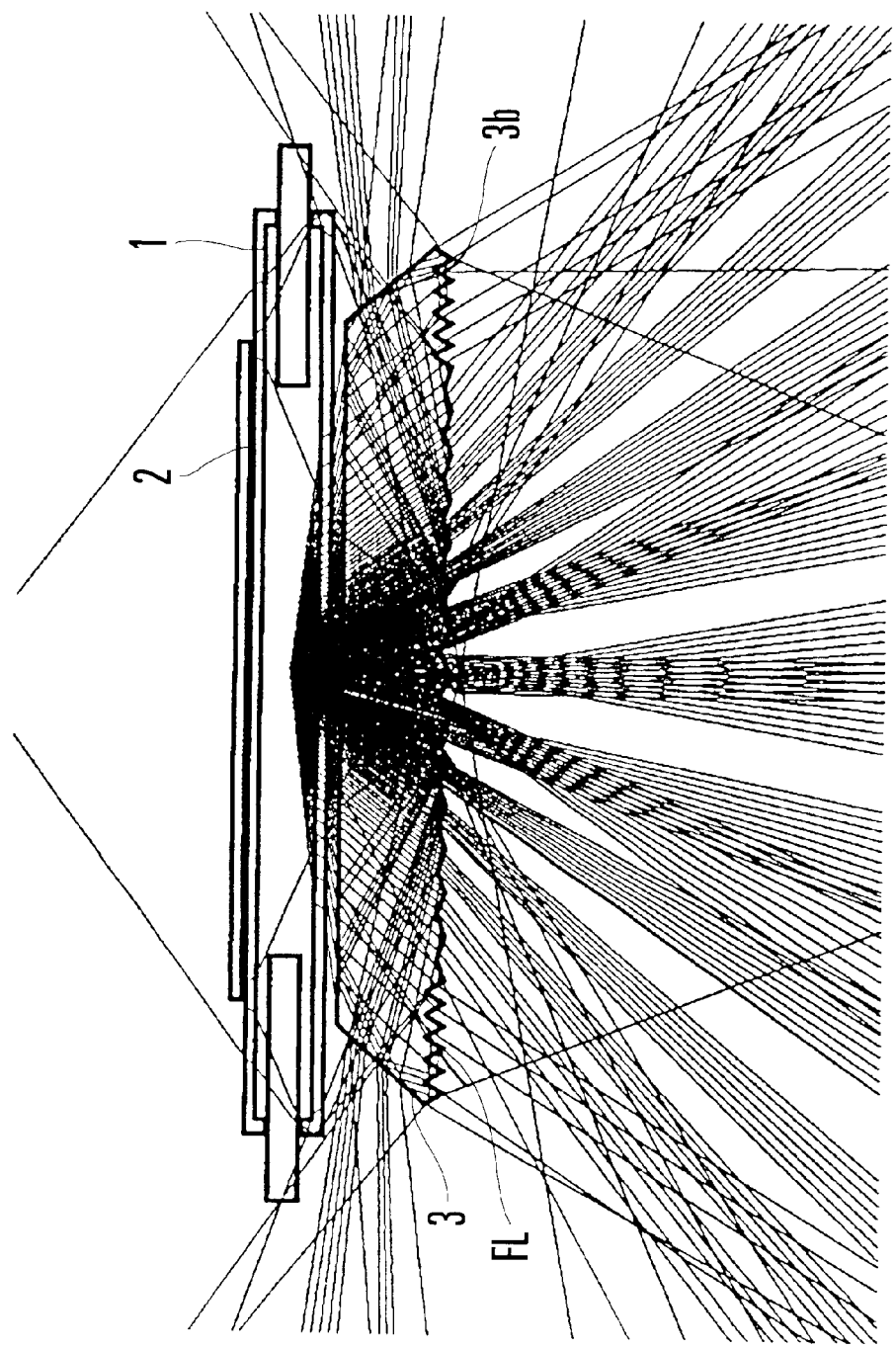
FIG. 7 is a sectional view in axial directions of the flash discharge tube in the first embodiment of the invention, showing dispersion of the rays of light from the center thereof when the apical angle of the front prism as an optical member is obtuse.
Figure 8:
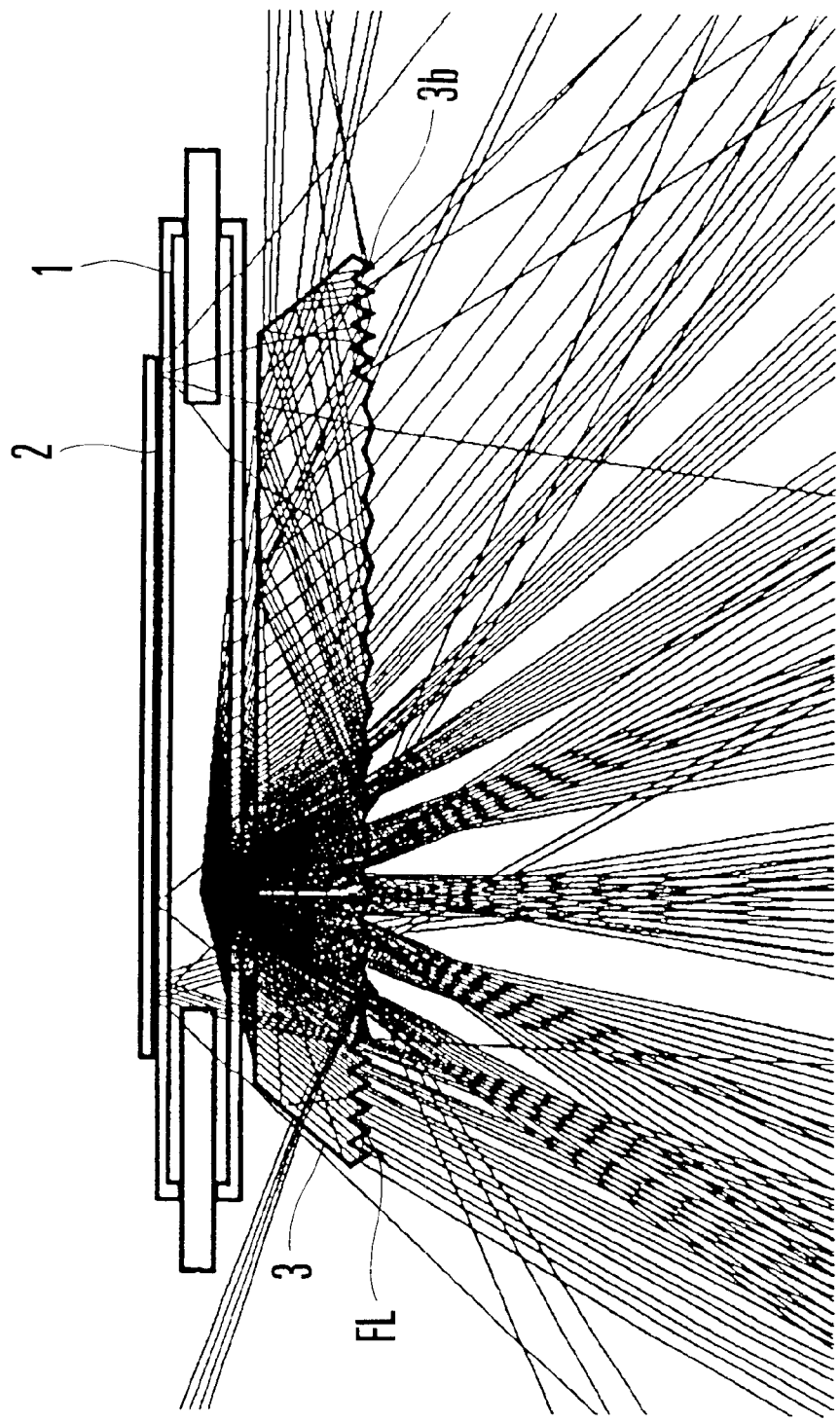
FIG. 8 is a sectional view in axial directions of the flash discharge tube in the first embodiment of the invention, showing another dispersion of the rays of light from the marginal portion thereof when the apical angle of the front prism as an optical member is obtuse.
Figure 9:
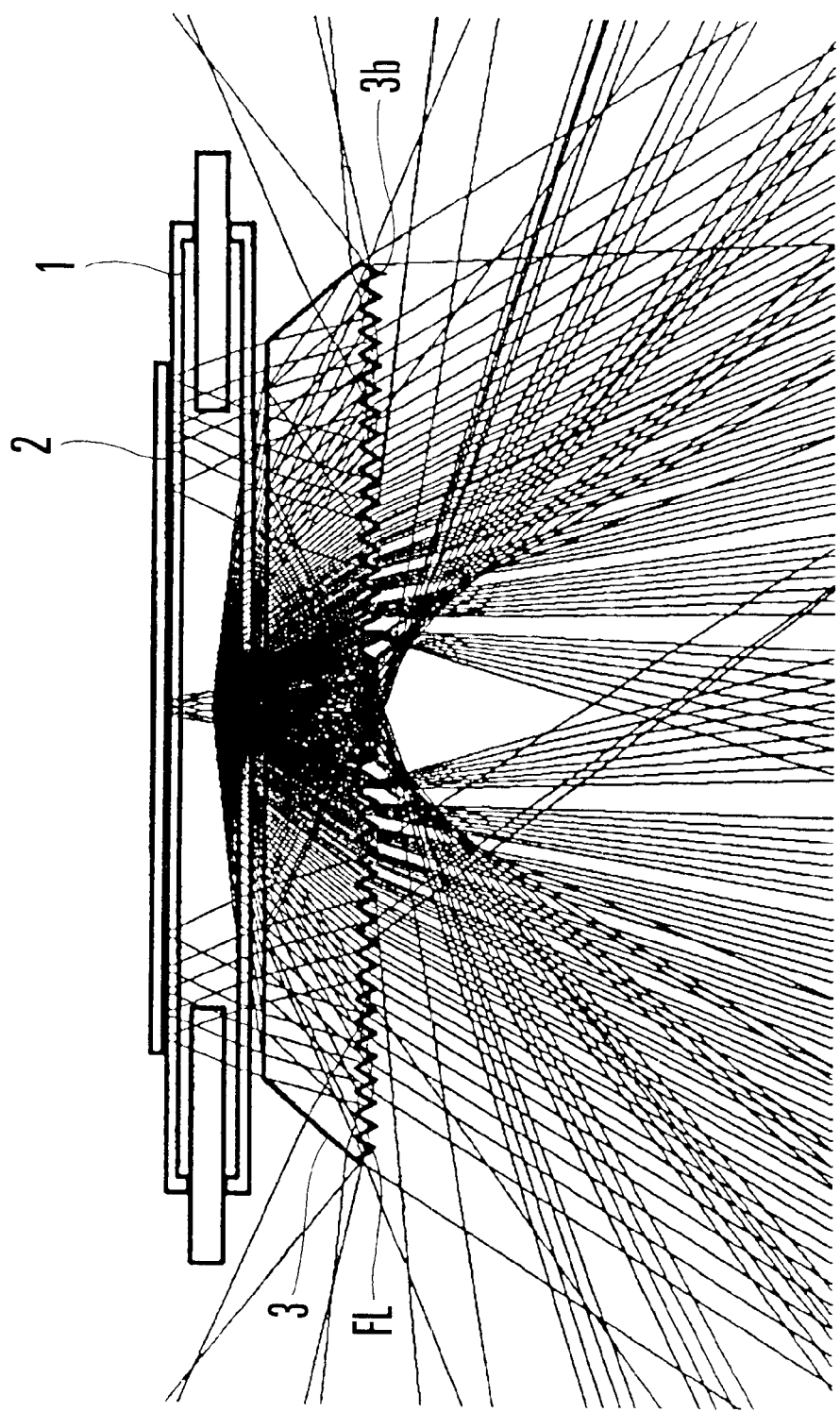
FIG. 9 is a sectional view in axial directions of the flash discharge tube in the first embodiment of the invention, showing dispersion of the rays of light from the center thereof when the apical angle of the front prism as an optical member is acute.
Figure 10:
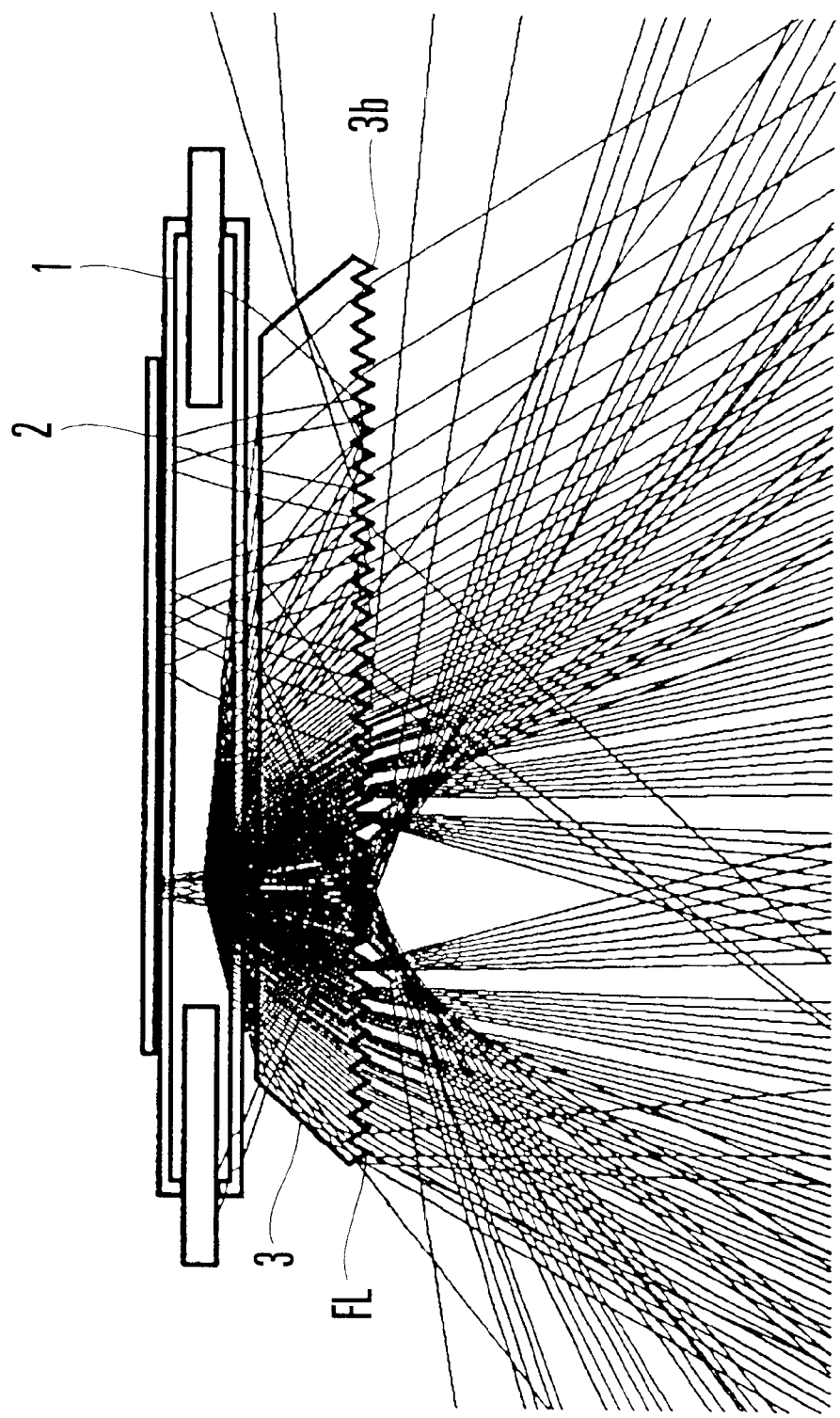
FIG. 10 is a sectional view in axial directions of the flash discharge tube in the first embodiment of the invention, showing another dispersion of the rays of light from the marginal portion thereof when the apical angle of the front prism as an optical member is acute.

So, first explanation is given to this characteristic by taking an example of the optical member 3 with the prisms of an extremely obtuse apical angle shown in FIGS. 7 and 8 and another example of an extremely acute apical angle shown in FIGS. 9 and 10.

In the example of FIGS. 7 and 8, the apical angle is determined to be 140°. As shown in FIGS. 7 and 8, in comparison with the first embodiment described before, the light beam issuing from the center of the flash discharge tube 1 is condensed as a whole, but the degree of condensation is weaker. For the outward oriented faces of the prisms which do not contribute to the beam condensation, most of the reflected fraction therefrom leaks from the side surfaces of the optical member 3. There is no component like that of the first embodiment which, after having reflected from the front surface, returns to the reflector and is used again. It is, therefore, impossible to effectively utilize the light which is lost by the total reflection from the front surface 3b.

Also, as shown in FIG. 8, the light beam issuing from the marginal point in the length of the flash discharge tube 1, too, displays a similar tendency. For this reason, though the condensibility of the entire light beam is higher than that of the Fresnel lens, the power of increasing the intensity of light in the central portion is weaker than that of the first embodiment. In a case where the required range of illumination of the illumination device is wide, there is an advantage. However, for the illumination optical system of narrow space with improved directivity, the beam condensing effect is rather insufficient.

Next, in the example shown in FIGS. 9 and 10, the apical angle of the prism surface FL is determined to be 60°. Not only the light beam issuing from the center in the length of the flash discharge tube 1 but also the light beam issuing from the marginal point has an identical tendency. Those of the rays from the firing point which direct themselves to the marginal zone as viewed from the optical axis, refract largely in passing through the front surface 3b or the prism surfaces FL. So, they cannot be utilized effectively. However, the other rays have a higher condensibility than in the first embodiment.

Figure 11:
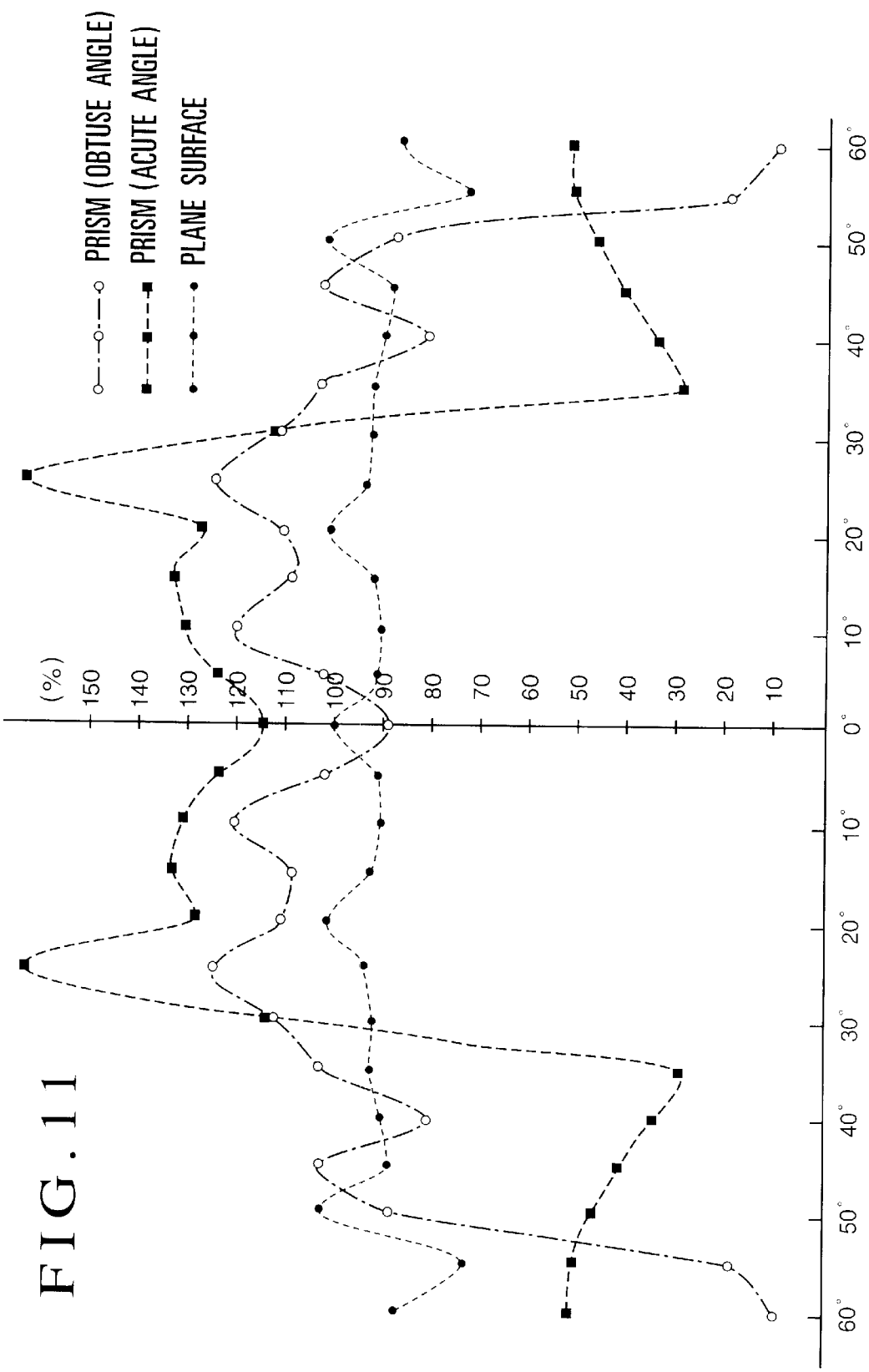
FIG. 11 is a graph of comparison of the light distribution characteristics in the axial directions of the flash discharge tube in the first embodiment of the invention as the apical angle of the front prism as the optical member varies.

For all the forms, their characteristics of light distribution along the axis of the flash discharge tube are shown in FIG. 11. Even in FIG. 11, similarly to FIG. 6, the light distribution characteristic of the smooth plane surface without the prism surfaces FL is simultaneously shown for the comparison purpose.

As is apparent from the examples shown in FIG. 11, not only in a case where the prism surfaces define the obtuse angle but also in the case of the acute angle, the light distributions are such that the light amount is lower in the central zone than in the marginal zone. Also, the range of light amounts lower by one step than the value at the center is used as the specification of the illumination, being as wide as about 110° when the prism angle is obtuse. When the prism angle is acute, it is narrowed to about 65°. In response to this, though the light amount at the center is lowered, a high light distribution is obtained over the entire range of angles described above, as compared with the control example of the smooth plane surface.

It will be appreciated from the foregoing that the minute prisms formed in the front surface of the optical member 3 of this kind condenses the light beam with an advantage to the light source of continuous firing band like that of the first embodiment (or the light source of constant brightness over a long range, for example, the axis of the flash discharge tube). The light distribution characteristic of this case does not depend on the distance from the light source but depends only on the apical angle of the prism surfaces and the refractive index of the optical member. The acuter the apical angle, the narrower the range of illumination becomes. The more obtuse the apical angle, the wider the range of illumination becomes.

Also, for this angle to determine, as shown in FIG. 11, if the prism angle is either too much obtuse or too much acute, the light amount at the center is lowered objectionably, so that an optimum value of the prism angle will be found within a certain range. The first embodiment lies within this optimum range. Therefore, all the dispersing rays are condensed in a certain range of illumination angles, and the light distribution is made desirable for the light amount at the center which is not lowered.

Next, determination of this optimum prism angle is described. At first, for the required range of illumination, the light emerging from the prism surfaces is forbidden from entering through the adjacent prism surfaces to the optical member. For this purpose, the following physical conditions are given.

After the refraction has been controlled by the prism surfaces, the required angle of illumination is assumed to have $\alpha$. By taking the apical angle $\theta$ of the prisms at larger than $\alpha$, even the most severe component emerging from the roots of the prism can be used without causing it to enter the prism surfaces again. From this point, for the required angle $\alpha$, the apical angle $\theta$ is determined so as to satisfy the following condition:

$$\theta \geq \alpha \tag{1}$$

With this condition, an optical system of no vignetting with good efficiency is obtained.

Figure 12:
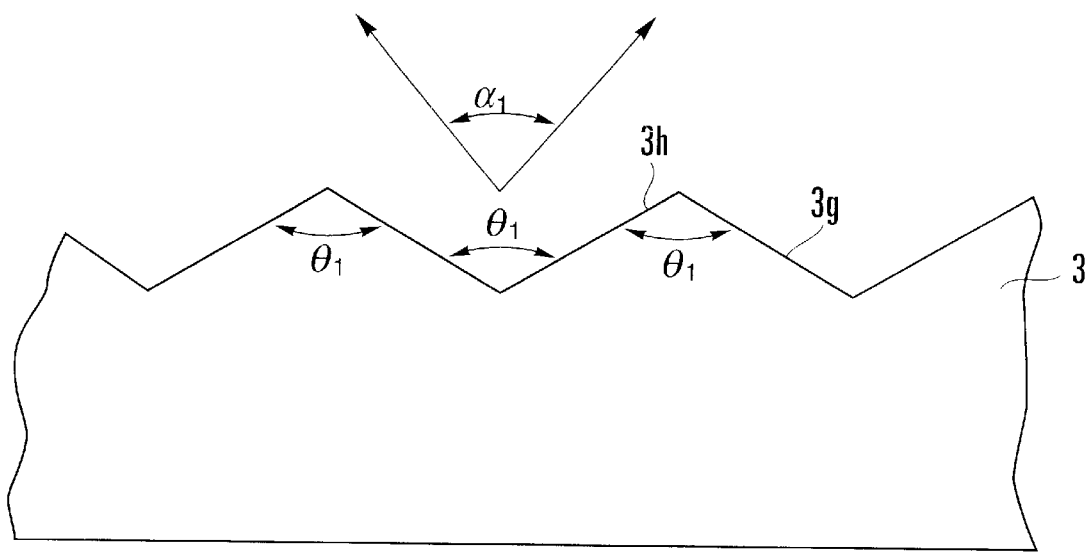
FIG. 12 is a diagram of geometry for explaining an optimum apical angle for the front prism as the optical member in the first embodiment of the invention.
Figure 13:
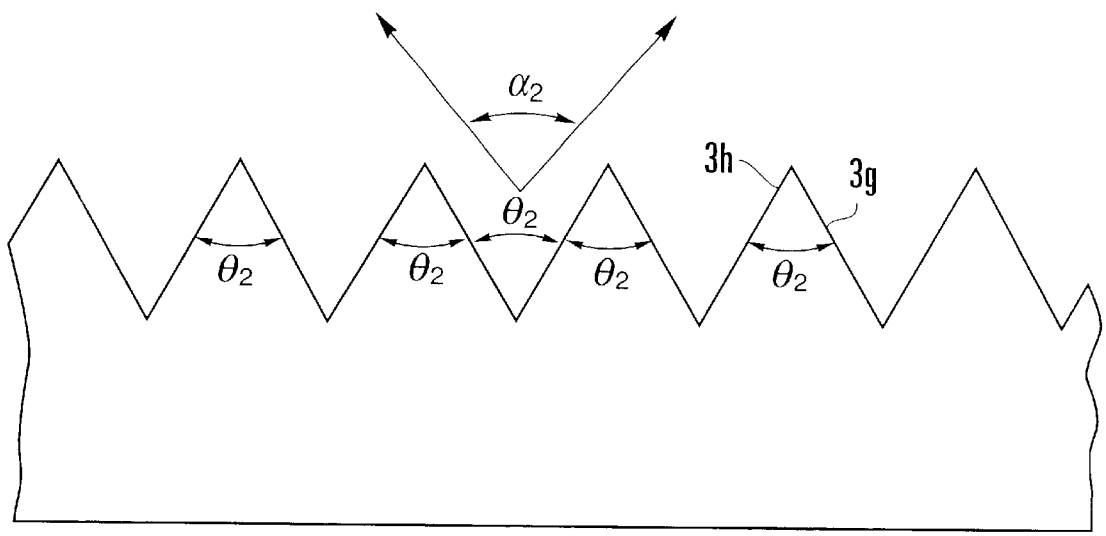
FIG. 13 is another diagram of geometry for explaining an optimum apical angle for the front prism as the optical member in the first embodiment of the invention.

This is depicted in FIGS. 12 and 13. For the purpose of contrasting them against the characteristic of the optical system described above, FIG. 12 shows an example of a relatively obtuse apical angle, where its value is $\theta 1=120°$ being the same as that of FIGS. 7 and 8. FIG. 13 shows another example of a relatively acute apical angle, where its value is $\theta 2=60°$ being the same as that of FIGS. 9 and 10.

Also, for the required angle of illumination, an ideal value to be used must be found. In FIGS. 12 and 13, this value is exemplified as $\alpha=80°$. This results in that, as is understandable even from FIG. 11, the apical angle $\theta$ of the prism and the illumination angle $\alpha$ nearly correspond to each other. As shown in FIG. 12, for a wide apical angle $\alpha 1$, the range of distribution (or the illumination angle $\alpha 1$) becomes slightly narrower than the apical angle of the prism. Also, as shown in FIG. 13, for a narrow apical angle $\theta 2$, the range of distribution (or the illumination angle $\alpha 2$) becomes slightly wider than the apical angle of the prism.

It is understandable from the above that, for the preset value of the required illumination angle $\alpha$, under the condition of FIG. 12, because the illumination range is wide, the loss to the outside of the required range increases. Under the condition of FIG. 13, though the beam condensibility is high, the illumination range is too narrow to satisfy the specification. It is, therefore, desired that the apical angle $\theta$ of the prism is made to approach the required illumination angle $\alpha$ from within a range not beyond it.

Meanwhile, in this method, the beam condensing action is related not only to the condition of the apical angle of the prism surfaces, but also very closely to the angle of incidence on the optical member 3 and to how each component is later refracted and directed to the required illumination range.

Figure 14:
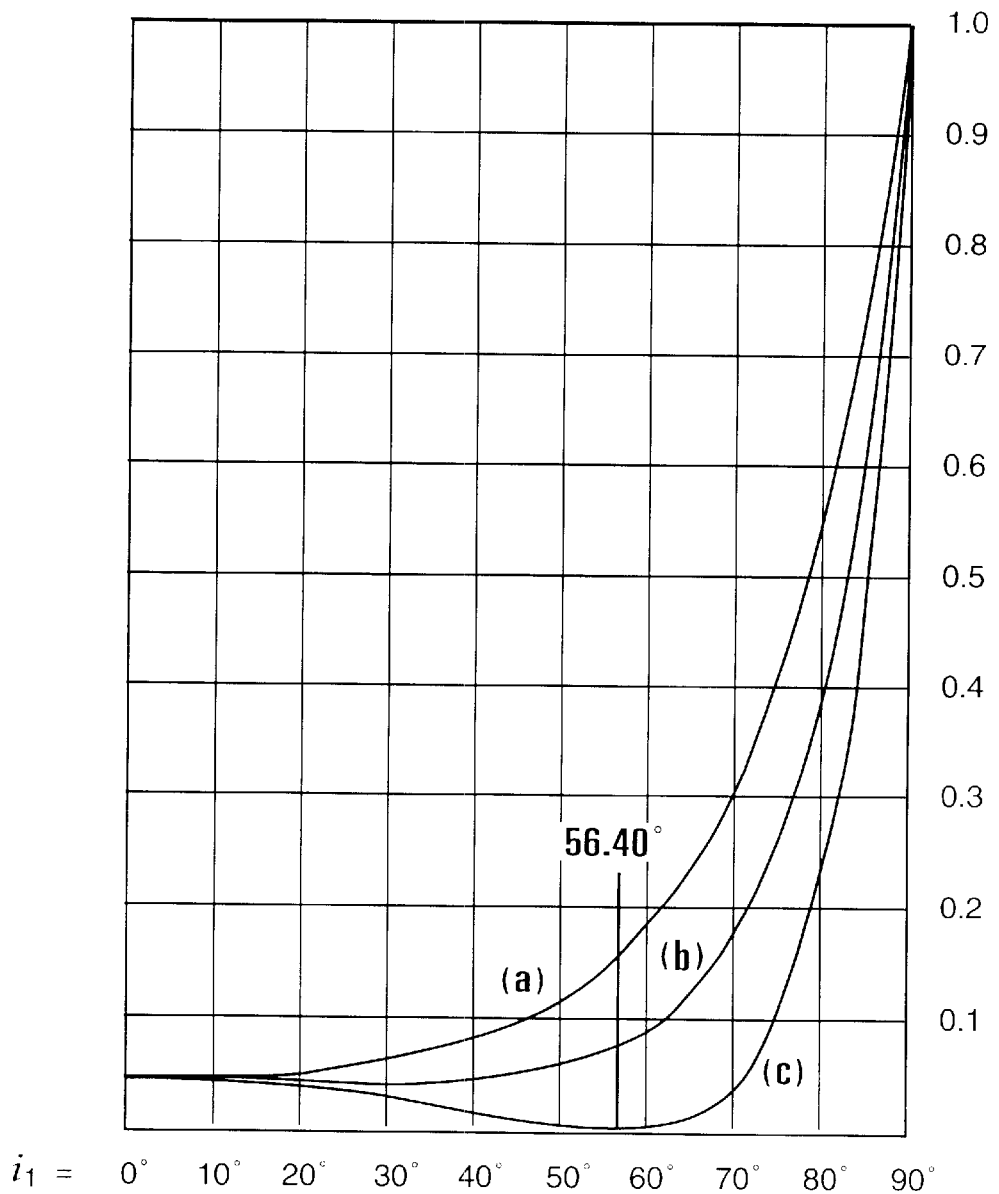
FIG. 14 is a graph of the rates of intensity of the reflected light components from the surface with respect to the angle of incidence on the optical member.

To explain this relationship, FIG. 14 shows variation of the intensity of the surface-reflected light with respect to the angle of incidence. Owing to the reflection from the entrance and exit surfaces of the optical member, a light loss is the phenomenon that will always occur if an expensive coating is not applied to the surfaces of the optical member. This surface reflection is lesser in some portions of the surfaces, which are good at efficiency. That these portions are selected to be used in controlling the beam condensation is one of the factors that must be considered on designing the compact illumination optical system as in the invention.

As shown in FIG. 14, this surface reflection has a characteristic that the reflecting component is low at about 10% when the angle of incidence is up to 65°, but as the angle of incidence increases from this value, it increases rapidly. That is, it is to be understood that even if the component having a larger angle of incidence than 65° is condensed by the refraction or reflection of the optical member, it is weak in intensity.

From this fact, the optical system that follows the entrance surface must be designed very well. Otherwise, it would be desired that the component that goes to the center of the required range is less than 40° at which the reflectivity hardly lowers against variation of the angle, and that the component that goes to the main part of the required range is less than an angle at which the intensity of the reflected light is below 10%, that is, less than 65°.

From this condition, at first, rules of design are to derive. Letting the refractive index of the optical material be denoted by n, the required illumination range by $\alpha$, and the angle of incidence by $\beta$, it is desired to determine the inward oriented face so as to satisfy the following relations.

At first, the ray that enters at an angle $\beta$ is brought to coincidence with the optical axis as looked at in the top view. As a condition for this, Snell law applies to the prism surfaces.

$$\sin[90°-\{\sin^{-1}(\sin \beta/n)+\theta/2\}]=\{\sin(90°-\theta/2)\}/n \quad (2)$$

By deforming this equation and solving for the apical angle $\theta$, the following equation is obtained:

$$\theta=2\times\tan^{-1}[[\cos\{\sin^{-1}(\sin \beta/n)\}-1/n]/(\sin\beta/n)] \quad (3)$$

Put into this equation are, by referring to FIG. 12, $\beta=40°$, and on assumption that, as the material of the optical member 3, acrylic resin is used, n=1.49171. Then, $$\theta=56.6°$$

is found. For the case where the optical material to be used is acrylic resin, therefore, as one of the conditions of not lowering the light amount at the center, it is desired to take the apical angle at 56.6° or larger.

In this respect, the used value of 60° in FIGS. 9 and 10 falls in the above-described range for setting up the apical angle. By reverse calculation, the component that contributes to the central light amount is found to have 38.2° in the angle of incidence. Though the light amount is somewhat lower than the peak, this decrease have almost no influence. Next, the central and marginal light amounts must differ largely. So, the component of an angle at which the intensity is weakened by the surface reflection is prevented from going to the marginal zone of the range of illumination. A condition for this is described here about a case where, as the angle of incidence increases from 65°, the surface reflection increases in strength rapidly and, therefore, this value is chosen as the maximum angle of incidence for the incident component of the marginal zone.

At first, letting the required illumination range be denoted by $\alpha$, the apical angle of the prism surfaces by $\theta$ and the effective maximum angle of incidence by $\gamma$, the above-described condition is expressed by the following equation of the prism surface:

$$\sin\{90°-(\alpha/2+\theta/2)\}=n\times\sin[90°-\{\theta/2+\sin^{-1}(\sin \gamma/n)\}] \quad (4)$$

By solving the equation for $\theta$, the following equation is obtained:

$$\theta=2\times\tan^{-1}[\cos(\alpha/2)-n\times\cos\{\sin^{-1}(\sin \gamma/n)\}]/\{\sin(\alpha/2)-\sin\gamma\} \quad (5)$$

Assuming here that, for example, the effective maximum angle of incidence is $\gamma=65°$, the required illumination range is $\alpha=80°$, and, if the material of the optical member is acrylic resin, its refractive index is n=1.49171, then putting these values into the above equation, $$\theta=115.6°$$

is found.

Ideally speaking, if the angle is made obtuse to this value or larger, a uniform light distribution up to the marginal zone can be obtained.

In actual practice, concerning the determination of the apical angle of the prism, besides the beam condensation by the inward oriented surface, the condensibility owing to the outward oriented surface becomes important in the real phenomenon. In other words, the large difference between the first embodiment and the examples shown in FIGS. 7 and 8 and FIGS. 9 and 10 is whether or not the component that goes to this outward surface of the prism is used effectively. How much the component impinging on this outward surface can be used again by utilizing the total reflection largely affects the effective utilization of the entire light beam and the increase of the central light amount.

As shown, for the obtuse apical angle, in FIGS. 7 and 8, most of the component impinging on the outward oriented surface of the prism advances toward the lateral sides of the optical member 3 and leaks out therefrom. So, there is almost no fraction which returns to the reflector again and is used effectively.

For the acute apical angle in FIGS. 9 and 10, because the prism surfaces are of steep slope, the light beam going to the outward surface is lost in a small proportion. However, the component going to the optical axis in a large proportion totally reflects from the prism surface, and then refracts at the paired prism surfaces, emerging therefrom as a component for the outside of the required illumination range. Therefore, a considerable light loss results. It is to be understood from the above that, as stated in the first embodiment, if determination of the apical angle is made in this intermediate range so as to minimize the lost amounts of the light beams of the two kinds described above, the efficiency becomes best.

To achieve this condition, it is desirable that, at first, for one of the prism surfaces, say the inward oriented surface 3g, the total reflection does not occur but only refraction works, when light advances to the required illumination range. As this condition, a most severe problem arises in that the rays going toward the optical axis has to refract.

For this purpose, it becomes necessary to satisfy the following condition:

$$\theta\geq2\times\{90°-\sin^{-1}(1/n)\} \quad (6)$$

For example, if, as the optical material, acrylic resin is selected, $$\theta\geq95.8°$$

is desired, because the angular component susceptible of little surface reflection and near to the optical axis can be conducted only by refraction to the required illumination range.

Figure 26:
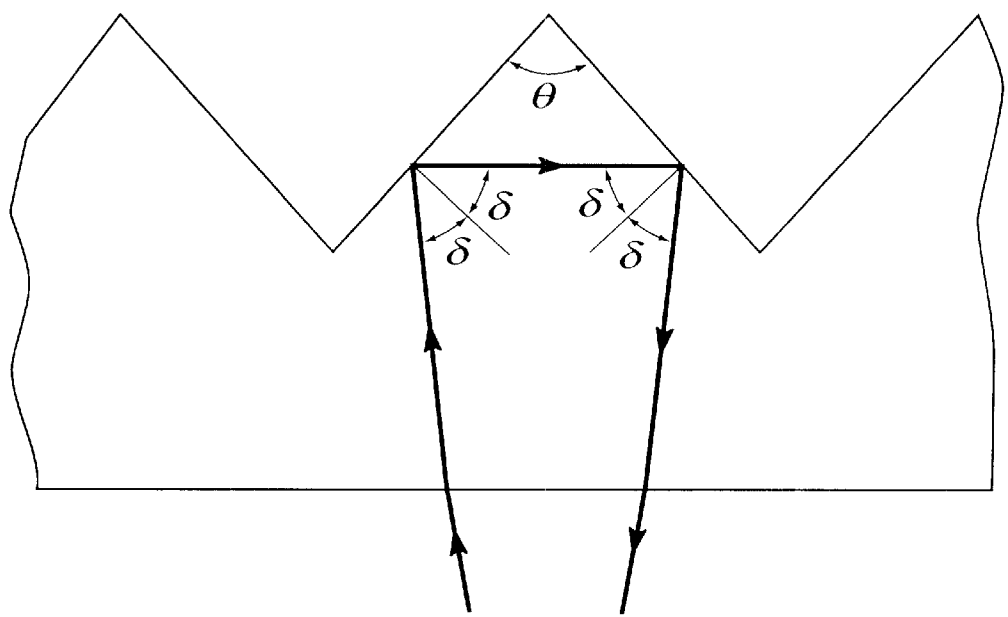
FIG. 26 is a diagram of geometry for explaining a form of the prism member in greatly enlarged scale according to the invention.

Meanwhile, the chief aim of the invention is that, after having let a fraction of the light totally reflect from the prism surface, that totally reflected light is used again. As a condition for this, it becomes necessary that the prism angle falls within the following range. At first, a minimum value is shown in FIG. 26. As shown in FIG. 26, it becomes necessary that the paired surfaces of a prism have the same inclination and the light totally reflects from the two surfaces in succession. In more detail, with the help of the critical angle $\delta$ in FIG. 26, the acceptable apical angle $\theta$ has to lie in the following range:

$$\theta \geq 2\delta = 2 \times \sin^{-1}(1/n) \tag{7}$$

When this condition is satisfied, it becomes possible that, despite of the beam directed to the subject of photographic interest, a fraction which is to become useless is totally reflected from the prism surfaces backward to the light source.

Figure 27:
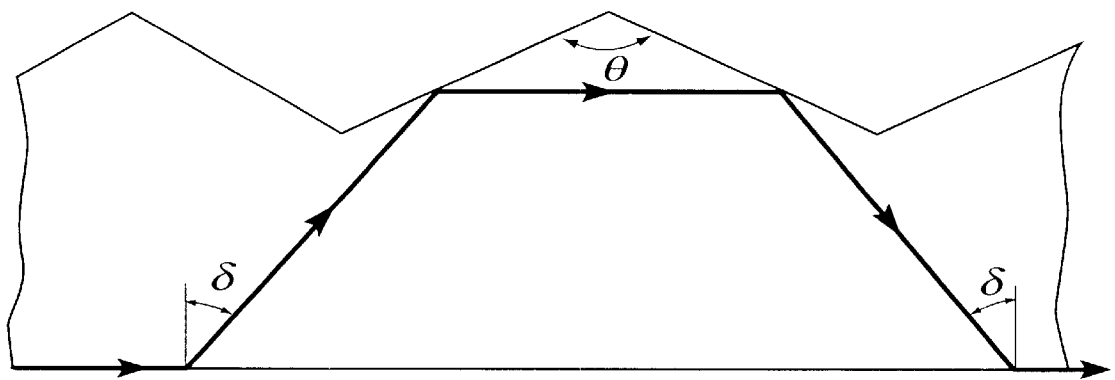
FIG. 27 is a diagram of geometry for explaining another form of the prism member in greatly enlarged scale according to the invention.

Also, a maximum value is shown in FIG. 27. For this maximum value, it is prerequisite that a ray entering the optical member 3 at the maximum angle of incidence, after having totally reflected from the prism surfaces, emerges from the entrance surface to the light source.

In this instance, when the critical angle is $\delta$, the apical angle $\theta$ is required to lie in the following range:

$$\theta \leq 90° + \delta = 90° + \sin^{-1}(1/n) \tag{8}$$

In conclusion, to make useful that fraction of the light beam which goes to the outside of the required illumination angle by utilizing the total reflection at the prism surfaces, it becomes necessary to satisfy the conditions (7) and (8) at the same time. Hence, the following condition is required to be satisfied:

$$2 \times \sin^{-1}(1/n) \leq \theta \leq 90° + \sin^{-1}(1/n) \tag{9}$$

On assumption that the material of the optical member 3 is, similarly to the above, acrylic resin, the necessary condition for the apical angle $\theta$ is that its value lies within the following range:

$$84.2° \leq \theta \leq 132.2°$$

Meanwhile, what is more desirable within this range is a region which satisfies the conditions (5) and (6). Assuming, as in the above description, acrylic resin, then $$95.8° \leq \theta \leq 115.6°$$

is found preferable.

In this instance, the acuter the apical angle $\theta$, the higher the central light amount and the narrower the illumination range. On the other hand, the more obtuse, the angle $\theta$, the lower the central light amount becomes, but the wider the illumination range can be made. In the first embodiment, the value employed is nearly at the center of this range, being $\theta=104°$. By applying such an angle determination, it is made possible to form an illumination optical system of extremely short optical path, while still improving the characteristic of light distribution to an ideal one.
(Second Embodiment)

Figure 15:
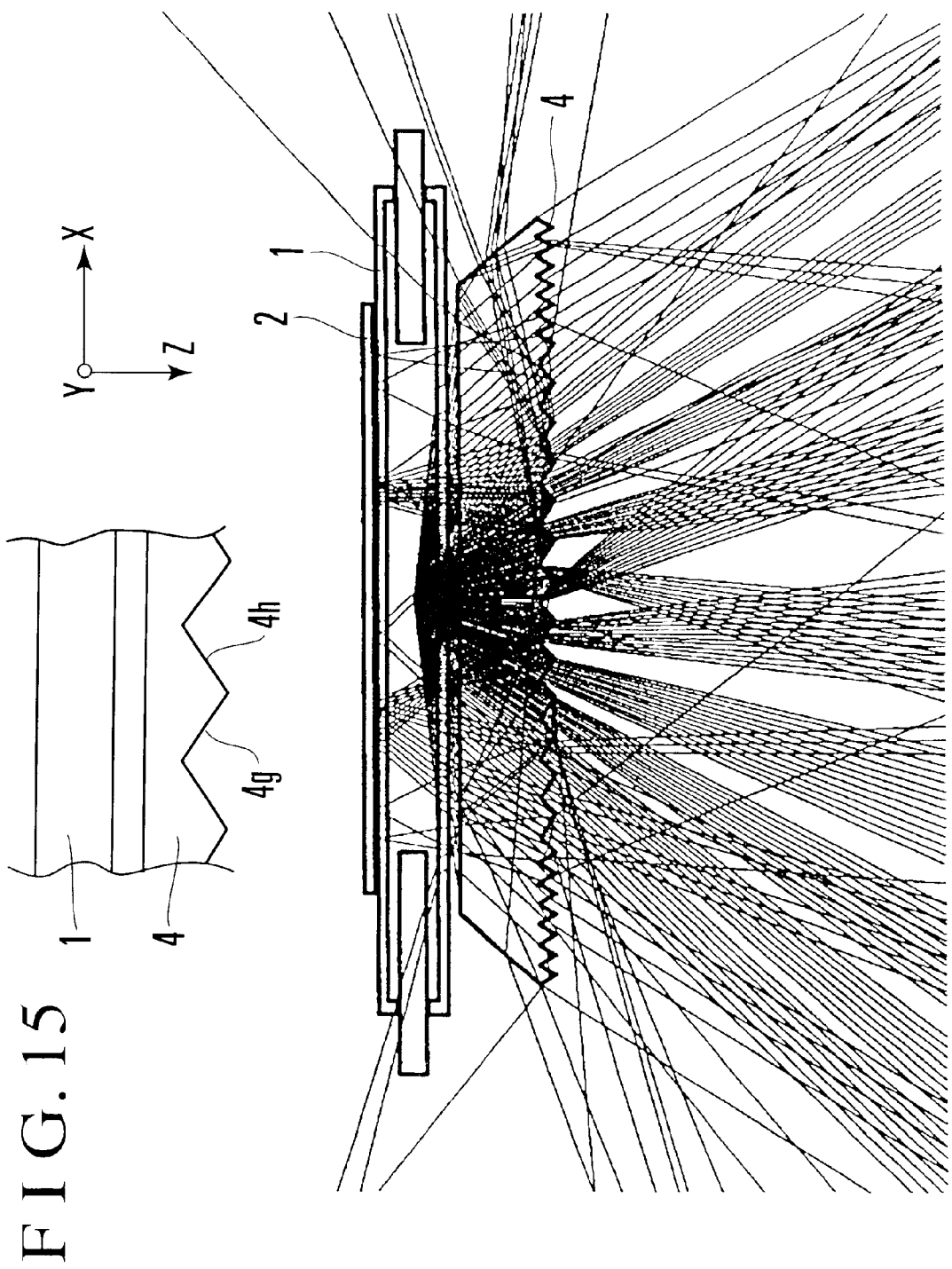
FIG. 15 is a sectional view in axial directions of a flash discharge tube in a second embodiment of the invention, showing dispersion of the rays of light from the center thereof.
Figure 16:
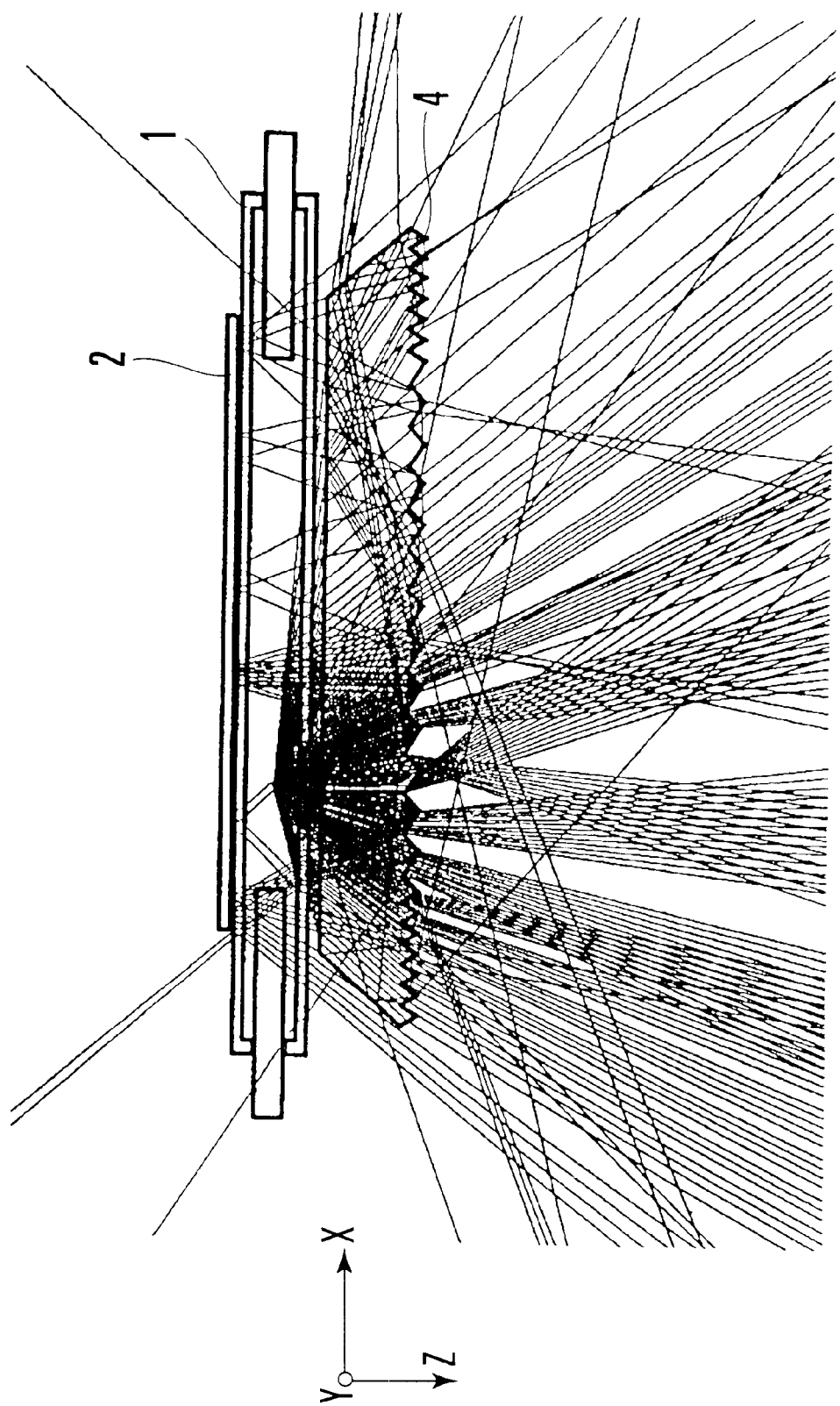
FIG. 16 is a sectional view in axial directions of the flash discharge tube in the second embodiment of the invention, showing another dispersion of the rays of light from the marginal portion thereof.

FIGS. 15 and 16 show a second embodiment of the illumination device according to the invention with the flash discharge tube 1 in the cross section along the axis thereof and also the issued rays from a representative point being traced. The second embodiment differs from the first embodiment in a point that, for the central zone of the front surface of an optical member 4, the prism surfaces 4g and 4h have their angles made not constant in each pair, but the paired left and right surfaces have different angles with the base surface from each other.

In an example of FIG. 15, the left and right angles differ by 10°. In such a manner, the prism surfaces 4g and 4h are formed in the front surface of the optical member 4, thereby making it possible to obtain an asymmetric light distribution in a line (X axis) perpendicular to the direction in which the prism surfaces 4g and 4h are formed.

In other words, as the above-described results of the first embodiment exhibit, determination can be made of the light distribution as narrow on the side of steeper angles, and as wider on the side of gentler angles. Such an arrangement provides a characteristic of light distribution shown in FIG. 17.

Figure 17:
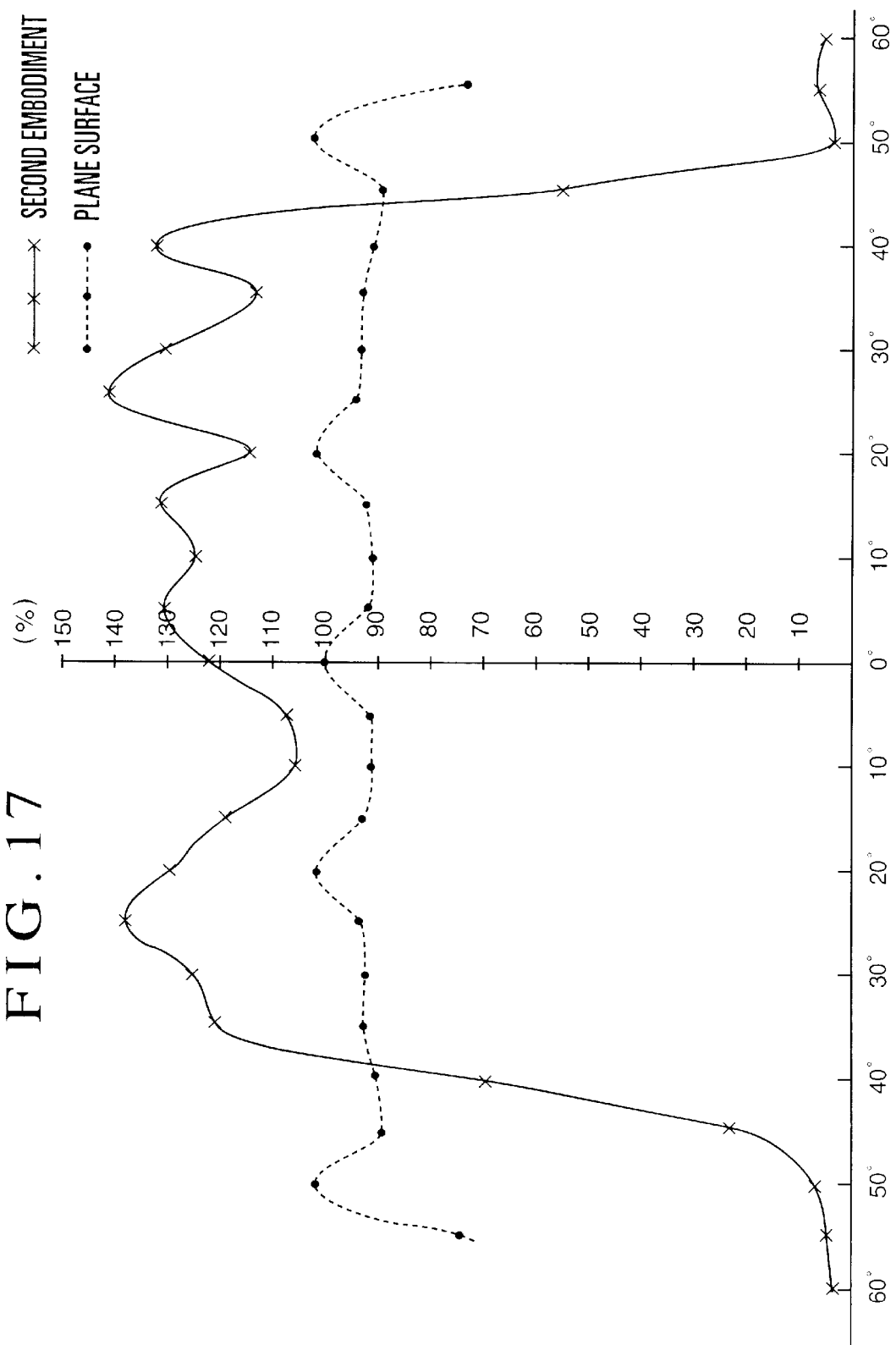
FIG. 17 is a graph of comparison of the light distribution in the axial directions of the flash discharge tube in the second embodiment with that for the front surface of flat plane.

In FIG. 17, for the purpose of comparison, there is simultaneously shown a light distribution characteristic of a plane surface with no prisms as would be formed in the front surface of the optical member 4. As can be seen also from FIG. 17, the light distribution in the axis (X axis) of the flash discharge tube displays different characteristics between both sides of the optical axis. Therefore, the illumination range, too, displays a different characteristic.

In FIG. 17, the illumination angle of the right side is wider by 4°. A merit of making determination of the left and right angles is due to the following reason. In a case where such an illumination optical system is used as the illumination device of the camera, the red-eye phenomenon or the like must be avoided. So, illumination is done from a different direction to the optical axis of the photographic lens.

In this instance, the field of angle of the photographic lens and the required range of illumination are brought into coincidence at a distance necessary to shoot. The required range of illumination for the illumination optical system is then changed in the shape of light distribution curve, becoming asymmetrical horizontally and vertically.

However, to provide the illumination optical system with a means for making it possible to turn the entire system as it is so that its optical axis aligns with the subject of photographic interest at a finite distance, a problem arises in that the entirety of the optical system increases in size. Also, with the illumination range left fixed horizontally symmetrical, when to obtain a light distribution adapted to both of far focusing and close focusing, illumination is done up to the outside of the actually required angular field. The energy loss is, therefore, increased. So, such an optical system could not be said to be desirable.

In particular, like the illumination optical system now proposed, an optical system aimed at extremely improving the compact form has no room for taking a space necessary to correct such a parallax. Therefore, as in the second embodiment described above, it is very effective means to do it by a simple method of varying the prism angle in each of the pairs of prism surfaces.

Also, since the found value of the angle by this method lies within the range shown in the first embodiment, it is possible to achieve the above-described aim while keeping hold of good efficiency. In the second embodiment described above, the angles are determined each as differing from the first embodiment by 5°, thus giving an angle change of 10°. Therefore, all fall in the ideal range of the angles. Even in this sense, it is understood that the horizontally asymmetric light distribution is realized with good efficiency and in a very small space.

(Third Embodiment)

Figure 18:
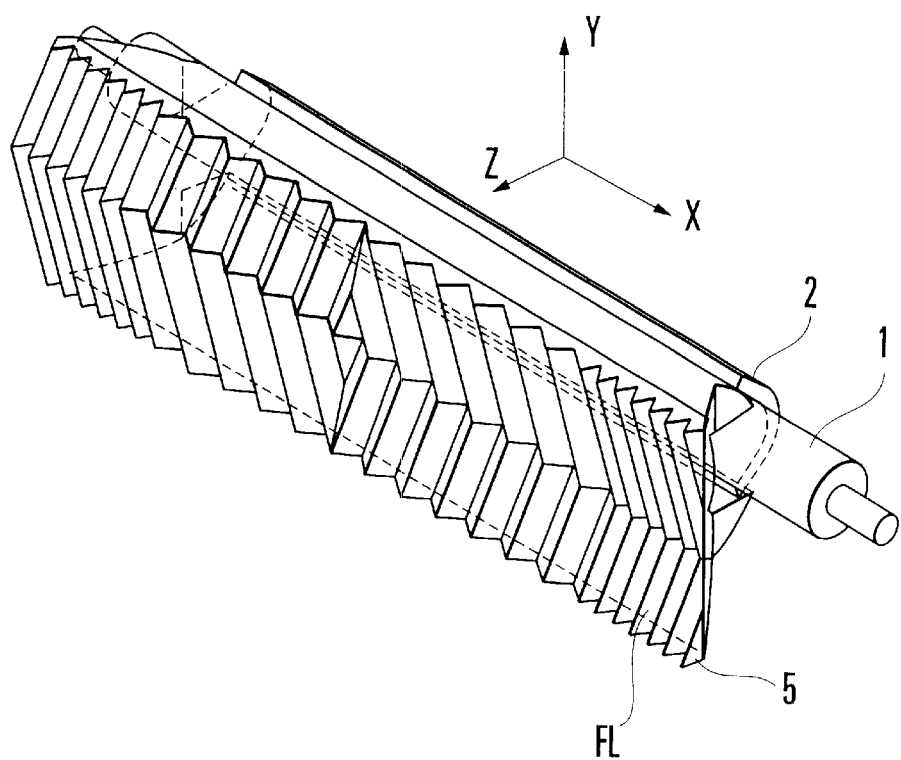
FIG. 18 is a perspective view of the main parts of an illumination device for photography according to a third embodiment of the invention.
Figure 19:
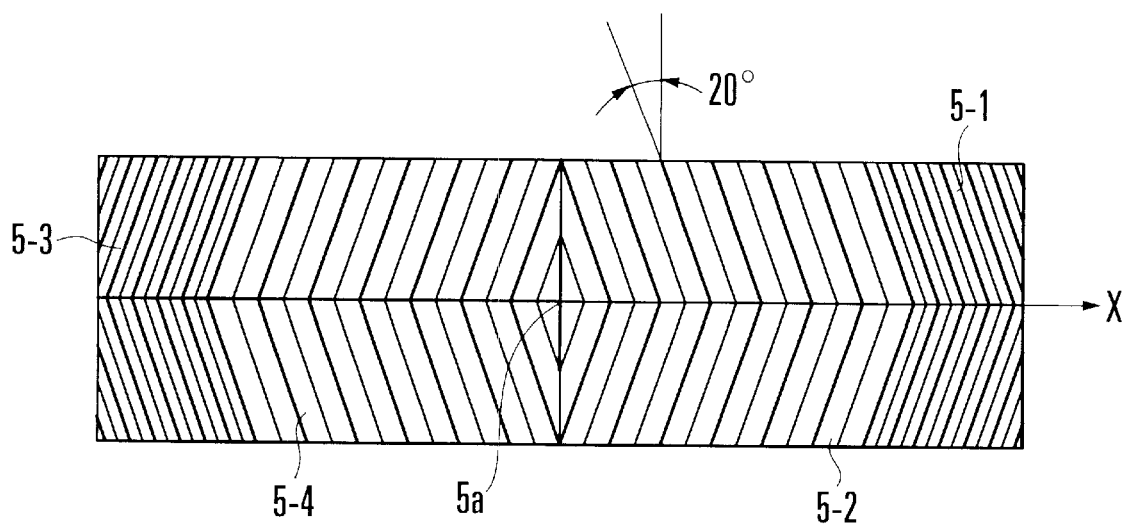
FIG. 19 is a front elevation view of the illumination device shown in FIG. 18.

FIGS. 18 and 19 are diagrams for explaining an illumination optical system according to a third embodiment of the invention. FIG. 18 is a perspective view and FIG. 19 is a front elevation view.

According to the third embodiment, the prism surfaces formed in the front surface of an optical member 5 are made up as inclined to a certain angle with respect to the axis of the flash discharge tube (or the X axis). In the example of FIG. 19, the prism layer on the front surface of the optical member 5 is divided into four areas 5-1, 5-2, 5-3 and 5-4, each of which is inclined at a certain angle inward to the optical axis 5a.

The reason for this is that, whilst, in the prior art, the uniform light distribution up to its four corners is hard to obtain, a uniform, ideal light distribution over the entire range of illumination can be obtained by inclining the prism surfaces at a certain angle with respect to the axis of the flash discharge tube.

Also, at this time, the angle with the axis of the flash discharge tube is not largely changed. Therefore, the incident light beam on the prism surfaces has not prominent directivity. As in the first embodiment, a light distribution of high beam condensibility can be obtained within the required range.

In the example of FIG. 18, the inclination of the prism surfaces FL is determined to be 20°. However, there is no reason of limiting the angle to this value. In response to selection of a region to be illuminated uniformly within the required range of illumination, the angle is desired to alter. Substantially, from the uniformity of the angle of incidence on the prism surfaces, this prism layer as a whole is desired to incline at an angle within a range of 0° to 45°.

Also, in the third embodiment, the divided areas of the prism layer are four layers. However, the number of division is not limited to this value. Depending on the necessary light distribution, the prism layer may be divided into a plurality of areas other than four layers so that the light distribution becomes uniform.

(Four Embodiment)

Figure 20:
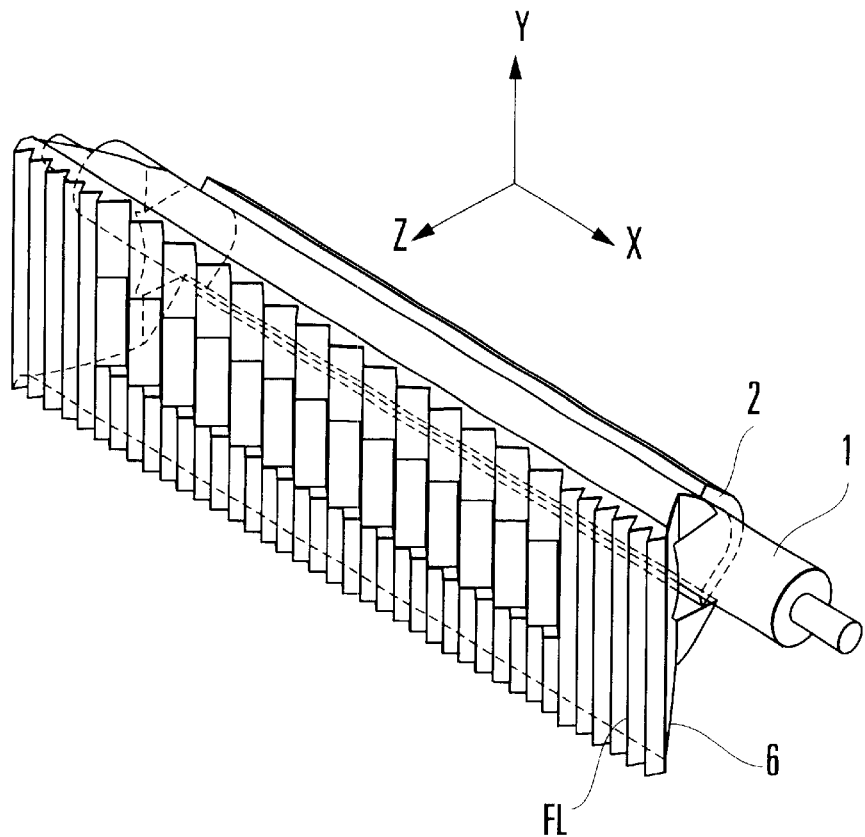
FIG. 20 is a perspective view of the main parts of an illumination device for photography according to a fourth embodiment of the invention.
Figure 21:
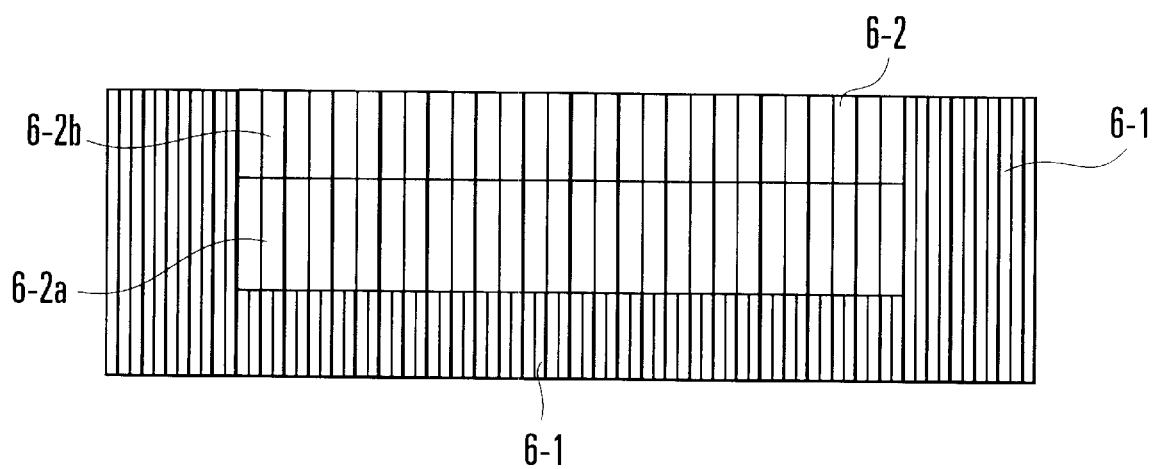
FIG. 21 is a front elevation view of the illumination device shown in FIG. 20.

FIGS. 20 and 21 are diagrams for explaining an illumination optical system according to a fourth embodiment of the invention. FIG. 20 is a perspective view and FIG. 21 is a front elevation view.

The fourth embodiment differs from the third embodiment in a point that the prism surface FL formed in the front surface of an optical member 6 is divided into two areas 6-1 and 6-2 in parallel with the axis of the light source or flash discharge tube 1 (the X axis).

As shown in FIG. 21, in the fourth embodiment, this prism layer, in an area corresponding to the substantial firing domain or the effective arc length of the flash discharge tube, is constructed from three layers of different prism characteristics, or a central area 6-2a and upper and lower areas 6-2b and 6-1.

In the fourth embodiment of FIG. 21, the difference of this prism layer, at first, between the central area 6-2a and the upper area 6-2b, is in the apical angle of the prism surfaces. By combining the prism surfaces of different apical angles in such a way, the light distribution on the illuminated plane can be adjusted in accordance with variation of the position. Moreover, because the respective light distribution characteristics overlap each other, the light distribution is freed from unevenness, thus improving the uniformity of light distribution.

Also, the difference between the central area 6-2a and the lower area 6-1 is obtained not by changing the apical angle of the prism surfaces, but by halving the pitch of spacing of the prisms.

Such change causes fundamentally no change of the light distribution. However, for the central zone, as the pitch is wider, the loss is lesser from the relation to the aperture ratio. For the marginal zone, the narrower the pitch spacing, the lesser the interference with the outer appearance member, and the lesser the loss.

In such a manner, because the prisms formed in the front surface of the optical member 6 are not always necessary to have their angles all made constant, it is also possible, as shown in the fourth embodiment, to apply arbitrary adjustment by considering the necessary light distribution on the illuminated plane, the efficient area of firing and others.

Also, by applying such an adjustment, it becomes possible to finely adjust the light distribution on the illuminated plane. Also, the adjustment in here is lower in sensitivity than the adjustment of the light distribution by the total reflection surface, being suited to the delicate adjustment of the light distribution.

Although the foregoing embodiments have been described on assumption that, as the material of the prisms, optical resin materials, especially acrylic resin is in use, it is to be understood that, as the material of the prisms, it is not confined to this material. Glass or like material of high transmittance, or material like filled-in liquid of high transmittance may be used instead of the above-described material.

Also, in the embodiments described above, as the optical member, the prism of three entrance surfaces is used. It is not always confined to this form. The conventional type of the form comprising a reflector and an optical panel having a Fresnel lens on the light exit side may be used with a modification such that the central zone (only the corresponding part to the arc length of the flash discharge tube) is replaced by a plurality of prisms described above. Even if so, similar results to those described above are attained. Thus, the beam condensation can be controlled with good efficiency by utilizing the total reflection.

Even in this case, if the distance from the light source to the optical panel (optical member) is short and the size of the aperture of the optical panel is small, the light beam can be condensed with good efficiency. Particularly for the bar-like light source, the axial condensibility is improved.

According to the invention, by specifying each parameter as the above, the size of the illumination optical system of the photographic apparatus is reduced to a compact form, while still permitting the optical characteristics to be prevented from lowering. Therefore, it is possible to achieve an illumination device capable of increasing the effective energy to illuminate the field of angle and a photographic apparatus using the illumination device.

Also, in the past, the beam condensation characteristic is difficult to improve by other than increasing the size. Now, it becomes possible to achieve an illumination device capable of remarkably improving the beam condensation in the longitudinal direction of the light source (or the axial direction of the flash discharge tube).

Further, it becomes possible to provide an illumination device which is reduced in size, is thinned in bulk and is made lighter in weight, while nonetheless making it possible to utilize the energy from the light source with a higher efficiency and, therefore, which is suited to still cameras, or video cameras, and to provide a photographic apparatus using the illumination device.

Besides, according to the invention, a fraction of the light beam going to the outside of the required range is made useful by total reflection to the reflector. So, the light distribution of lesser directivity arranged at a close distance can be converted to the angular component of a certain range of angles with good efficiency. Particularly for the bar-like light source, particularly the axial component of the issuing light is condensed advantageously.

Also, for the outside of the zone of the total reflection, or the corresponding region of the exit surface to the outside of the effective firing portion of the flash discharge tube, the prism surfaces are formed with their angles made steep on supposition of only different refraction control than in the central region. Accordingly, it is made possible to condense the light beam with high efficiency.

What is claimed is:

1. An illumination device comprising:

light source means; and an optical member having an entrance surface which a light beam from said light source means is made to enter and an exit surface from which the light beam having entered the entrance surface is made to exit, wherein a plurality of prism portions each having an apical angle are arranged at the exit surface of said optical member, wherein a part of the plurality of prism portions totally reflect a part of the flight beam having entered the entrance surface, wherein said light source means has a tube-like shape, and the plurality of prism portions are formed such that a ridgeline forming each apical angle of the plurality of prism portions is approximately perpendicular to the longitudinal direction of the tube-like shaped light source means; and wherein each apical angle of prism portions located in a central region of the optical member is an obtuse angle and approximately equal, and each apical angle of prism portions located in regions surrounding the central region is an acute angle and approximately equal, among a plurality of prism portions.

2. An illumination device according to claim 1, wherein the part of the plurality of prism portions are prism portions corresponding to a central region of light emission of said light source means.

3. An illumination device according to claim 1, satisfying the following condition:

$$2\times\{\sin^{-1}(1/n)\} \leq \theta \leq 90° + \sin^{-1}(1/n)$$

where n is a refractive index of material of the plurality of prisms, and θ is an apical angle of each of the plurality of prism portions.

4. An illumination device according to claim 1, wherein a pitch interval of the plurality of prism portions is not less than 0.2 mm and not more than 2 mm.

5. An illumination device according to claim 1, wherein said optical member further has an additional entrance surface and a total-reflection surface which totally reflects a light beam having entered the additional entrance surface to lead the light beam to the plurality of prism portions.

6. An illumination device according to claim 1, wherein the plurality of prism portions have different apical angles for every different regions thereof, and the prism apical angle in a central region is larger than the prism apical angle in a marginal region.

7. An illumination device according to claim 1, wherein said light source means has a tube-like shape, and the plurality of prism portions are formed such that a ridgeline forming each apical angle of the plurality of prism portions is inclined to a predetermined angle which is within a range of 45° to 90° with respect to a longitudinal direction of the tube-like shape.

8. An illumination device according to claim 1, wherein said light source means has a tube-like shape, and a reflector of approximately cylindrical shape is disposed immediately behind said light source means.

9. An illumination device according to claim 8, wherein said reflector has a cylindrical surface and a flat surface, and the flat surface is in contact with said optical member.

10. A camera into which said illumination device according to claim 1 is incorporated.

11. An illumination device comprising;

light source means; and an optical member which makes a light beam from said light source means enter said optical member at an entrance surface thereof and exit from an exit surface thereof, wherein said optical member has a prism member in which a plurality of prism portions are arranged on the exit surface said plurality of prism portions having ridgelines which are parallel and apical angles, wherein the following condition is satisfied:

$$2\times\{90°-\sin^{-1}(1/n)\} \leq \theta \leq 90° + \sin^{-1}(1/n)$$

where n is a refractive index of material of the prism member, and θ is an apical angle of each of the plurality of prism portions, wherein said light source means has a tube-like shape, and the plurality of prism portions are formed such that a ridgeline forming each apical angle of the plurality of prism portions is approximately perpendicular to the longitudinal direction of the tube-like shaped light source means, and wherein each apical angle of prism portions located in a central region of the optical member is an obtuse angle and approximately equal, and each apical angle of prism portions located in regions surrounding the central region is an acute angle and approximately equal, among a plurality of prism portions.

12. An illumination device according to claim 11, wherein a part of the plurality of prism portions corresponding to a central region of light emission of said light source means totally reflect a part of the light beam from said light source.

13. An illumination device according to claim 11, wherein a pitch interval of the plurality of prism portions is not less than 0.2 mm and not more than 2 mm.

14. An illumination device according to claim 11, wherein said optical member further has an additional entrance surface and a total-reflection surface which totally reflects a light beam having entered the additional entrance surface to lead the light beam to the plurality of prism portions.

15. An illumination device according to claim 11, wherein the plurality of prism portions have different apical angles for every different regions thereof, and the prism apical angle in a central region is larger than the prism apical angle in a marginal region.

16. An illumination device according to claim 11, wherein said light source means has a tube-like shape, and the plurality of prism portions are formed such that a ridgeline forming each apical angle of the plurality of prism portions is inclined to a predetermined angle which is within a range of 45° to 90° with respect to a longitudinal direction of the tube-like shape.

17. An illumination device according to claim 11, wherein said light source means has a tube-like shape, and a reflector of approximately cylindrical shape is disposed immediately behind said light source means.

18. An illumination device according to claim 17, wherein said reflector has a cylindrical surface and a flat surface, and the flat surface is in contact with said optical member.

19. A camera into which said illumination device according to claim 11 is incorporated.

20. An illumination device comprising:

light source means;

an optical member located on the side of an object of said light source means;

a plurality of prism portions arranged adjacent said optical member and having apical angles, wherein, among said plurality of prism portions, each apical angle of prism portions located adjacent a central region of said optical member is an obtuse angle and approximately equal, and each apical angle of prism portions located adjacent regions surrounding the central region is an acute angle and approximately equal, and a part of the prism portions totally reflect a part of the light beam, and wherein said light source means has a tube-like shape, and the plurality of prism portions are formed such that a ridgeline forming each apical angle of the plurality of prism portions is approximately perpendicular to the longitudinal direction of the tub like shaped light source means.

* * * * *

UNITED STATES PATENT AND TRADEMARK OFFICE
CERTIFICATE OF CORRECTION

PATENT NO. : 6,467,931 B2  Page 1 of 1
DATED : October 22, 2002
INVENTOR(S) : Yoshiharu Tenmyo It is certified that error appears in the above-identified patent and that said Letters Patent is hereby corrected as shown below:

Column 16,
Line 45, delete "$\alpha$" and insert --  --,

Signed and Sealed this

Twenty-first Day of October, 2003

JAMES E. ROGAN
*Director of the United States Patent and Trademark Office*